(12) United States Patent
Kanemori et al.

(10) Patent No.: US 6,275,274 B1
(45) Date of Patent: Aug. 14, 2001

(54) REFLECTIVE LCD WITH REDUCED COLOR SHADE PATTERN CYCLE

(75) Inventors: Yuzuru Kanemori, Nara; Kazuhiko Tsuda; Kozo Nakamura, both of Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/168,319

(22) Filed: Oct. 8, 1998

(30) Foreign Application Priority Data

Oct. 17, 1997 (JP) .................................................. 9-285766

(51) Int. Cl.[7] .................................................. G02F 1/1343
(52) U.S. Cl. ............................. 349/42; 349/109; 349/145
(58) Field of Search ................................ 349/42, 43, 139, 349/143, 145, 109

(56) References Cited

U.S. PATENT DOCUMENTS

| 4,965,565 | * | 10/1990 | Noguchi | 345/93 |
| 5,150,240 | * | 9/1992 | Kim | 349/43 |
| 5,151,689 | * | 9/1992 | Kabuto et al. | 349/109 |
| 5,641,974 | * | 6/1997 | Den Boer et al. | 257/59 |
| 5,745,093 | * | 4/1998 | Tsuzuki et al. | 349/103 |
| 5,760,857 | * | 6/1998 | Yanagawa et al. | 349/43 |
| 5,822,026 | * | 10/1998 | Matsuo | 349/38 |
| 5,852,488 | * | 12/1998 | Takemura | 349/187 |

FOREIGN PATENT DOCUMENTS 6-95154 A   4/1994 (JP) .

OTHER PUBLICATIONS

Sakamoto, "A High Aperture Ratio 3 in. Diagonal VGA s–Si Light Valve with Pixel/Data and Pixel/Gate Lines Overlapping", SID May 1996 Digest.*

* cited by examiner

Primary Examiner—Kenneth Parker
(74) Attorney, Agent, or Firm—Nixon & Vanderhye P.C.

(57) ABSTRACT

The reflective liquid crystal display device of this invention includes: a pair of substrates sandwiching a liquid crystal layer therebetween; a plurality of pixel electrodes having a delta arrangement formed on one of the pair of substrates; a plurality of signal lines formed on the one of the pair of substrates, the signal lines having bent portions; a plurality of scanning lines formed on the one of the pair of substrates, the plurality of scanning lines and signal lines being formed to run along peripheries of the plurality of pixel electrodes so as to cross each other; and a plurality of thin film transistors electrically connected to the plurality of signal lines for controlling potentials of the pixel electrodes, wherein at least one of the plurality of thin film transistors is formed at a position where the distance between two adjacent signal lines of the plurality of signal lines is reduced by the bent portion of at least one of the two adjacent signal lines.

29 Claims, 20 Drawing Sheets

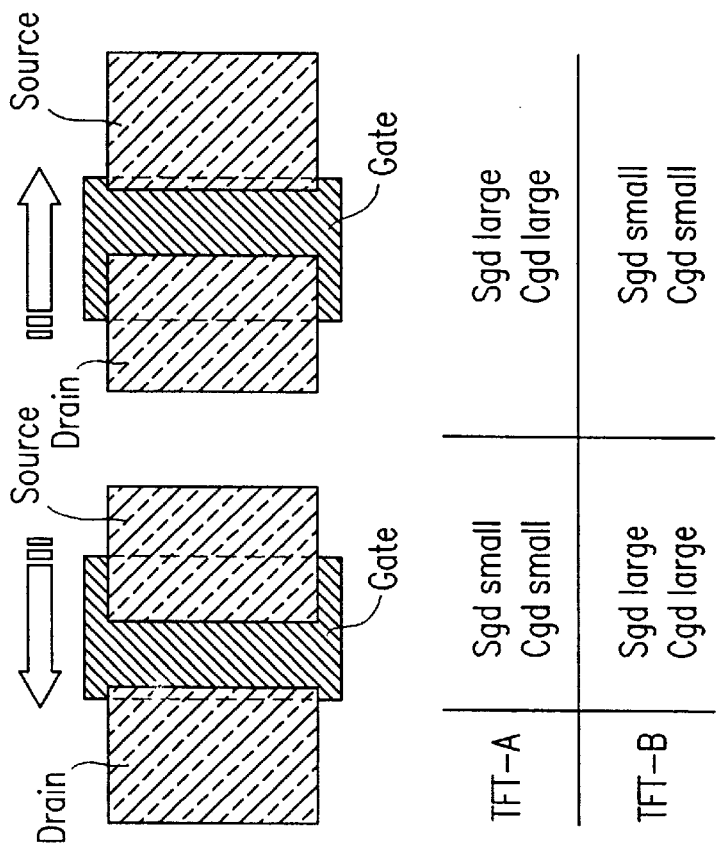
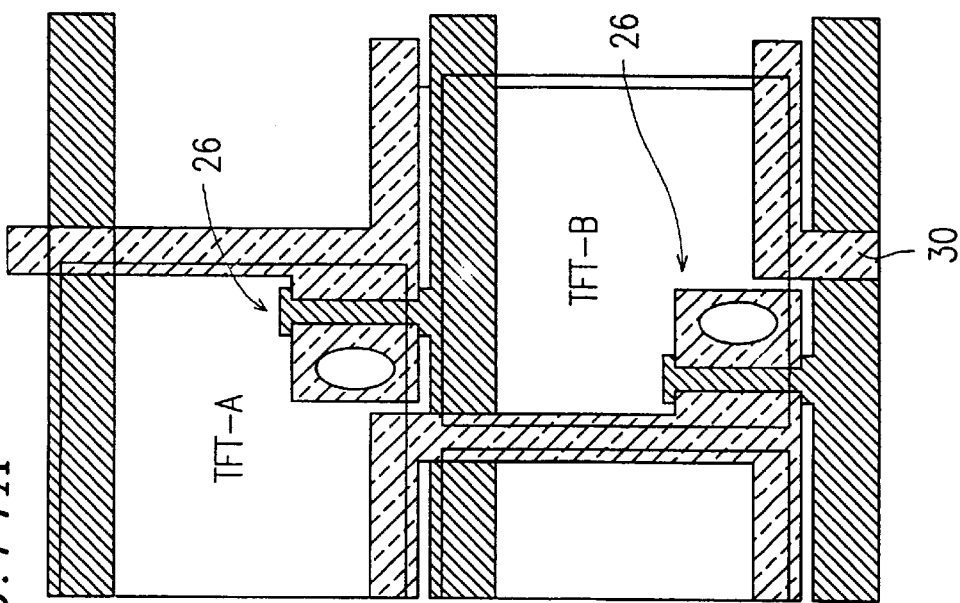

Prior art example

Present invention

REFLECTIVE LCD WITH REDUCED COLOR SHADE PATTERN CYCLE

BACKGROUND OF THE INVENTION

1. Field of the Invention

The present invention relates to a reflective liquid crystal display device which is widely used as display devices for computers, portable information terminals, electronic calculators, electronic organizers, and the like.

2. Description of the Related Art

Reflective liquid crystal display devices have been widely used for various types of portable apparatuses due to their low power consumption. In recent years, with the sophistication of information, a demand for performing color display for such portable apparatuses has increased. As such, reflective color liquid crystal display devices have been actively developed.

FIG. 14 is a schematic plan view of a configuration of a conventional active matrix type reflective liquid crystal display device. FIG. 15 is a plan view illustrating the conventional display device of FIG. 14 in more detail. FIG. 16 is a sectional view illustrating the structure of an amorphous silicon (a-Si) thin film transistor (TFT) which is used as an active element for the reflective liquid crystal display device.

The configuration and the fabrication method of the conventional reflective liquid crystal display device will be described with respect to FIGS. 14 to 16.

First, a metal film is formed on a glass substrate by sputtering and patterned by photolithography and etching, to form gate bus lines (scanning lines) 20 and gate electrodes 21 of TFTs 26.

Then, a gate insulating film 40, a semiconductor layer 41, and a contact layer 42 are sequentially formed and patterned so that semiconductor layers 41 and contact layers 42 are at least partially formed at portions above the gate electrodes 21.

Thereafter, a metal for source bus lines (signal lines) 30 is deposited by sputtering and patterned, to form the source bus lines 30 as well as source electrodes 31 and drain electrodes 32 of the TFTs 26. Subsequently, the portions of the contact layers 42 located above channel portions of the TFTs 26 are removed.

An interlayer insulating film 50 is formed over the resultant substrate to flatten the uneven top surface of the substrate. Contact holes 33 are then formed through the depth of the interlayer insulating film 50 at positions above the drain electrodes 32.

Finally, a metal thin film is formed and patterned to form reflective pixel electrodes 60. The pixel electrodes 60 are in electrical contact with the corresponding drain electrodes 32 via the contact holes 33.

Thus, an active matrix substrate is fabricated. The resultant active matrix substrate is bonded together with a counter substrate including a counter electrode formed on substantially the entire surface thereof with a predetermined -space therebetween. A liquid crystal material is injected into the space between the substrates and forms a seal therebetween, thereby to complete the reflective liquid crystal display device.

As shown in FIG. 14, the illustrated conventional reflective liquid crystal display device employs a pixel arrangement called a delta arrangement, which is advantageous, in general, in the display of video images, static images, and the like. When the pixel electrodes 60 are formed to overlap the adjacent gate bus lines 20 having the interlayer insulating film therebetween, a storage capacitance (Cs) is produced at each of the overlap portions and the area of each pixel electrode 60 increases. This overlap structure therefore serves to increase the amount of reflected light from the display device.

However, the above configuration has the following problem. Since each of the above Cs portions is recognized as part of a pixel region, the resultant pixel region has a shape as shown in FIG. 18, which is composed of a pixel portion 60a of substantially a rectangular shape (the shape of a pixel electrode obtained when no Cs portion is formed as shown in FIG. 17) and an additional pixel portion (extending portion) 60b corresponding to the Cs portion extended from the pixel portion 60a to a considerable extent. With this shape of the pixel electrodes, when the display screen is divided into sections Q, P, and O defined by vertically dashed lines as shown in FIG. 18, and the occupation of the area of red (R) pixels, for example, in the entire area of each divided section (hereinafter, referred to as the area occupation of R pixels, for example) is compared with those of other divided sections, the result of Q>P>O is obtained as will be described hereinbelow. FIG. 18 illustrates only three rows of pixels as an example, and thus the center section Q among the three is shown as including only one red (R) pixel. It should be noted that since the same pattern of pixel arrangement continues in the vertical direction, if four rows of pixels were taken into consideration, the area occupation of R pixels would have been the same for the three sections Q. The above description regarding the area occupation of R pixels is also applicable to other colors G and B. As shown in FIGS. 14 and 15, the TFTs 26 are formed on the right and left sides of each source bus line 30 alternately, and the pixels of the same color are connected to each source bus line 30.

FIG. 19A is a simplified illustration of the aforementioned area occupation of R pixels. Referring to FIG. 19A, while section Q has a high area occupation of red pixels, section P has a reduced area occupation since only part of the additional pixel portions 60b where the red pixels overlap the gate bus lines 20 are included therein, and section O includes no red pixel portions therein.

Thus, as will be observed from FIG. 19A, in the conventional reflective liquid crystal display device, a pattern of the sections Q, P, Q, and O constitutes one pattern cycle which corresponds to three pixel regions. This means that one pitch (one pattern cycle) of color shade is three times as large as the pixel pitch. Accordingly, when the pitch of one pixel is several tens of micrometers or more, the difference in the density (i.e., occupation area) of each color is visually recognized as vertical stripes, and a vertical stripe pattern is observed at a pitch three times as large as the pixel pitch, i.e., at a pitch of approximately 0.5 mm. This degrades the display quality. More specifically, when the pixel arrangement shown in FIGS. 14 and 15 is employed, such a vertical stripe pattern is observed on a screen for image display which has a size of 3 inches diagonally and includes tens of thousands of pixels.

SUMMARY OF THE INVENTION

The reflective liquid crystal display device of this invention includes: a pair of substrates sandwiching a liquid crystal layer therebetween; a plurality of pixel electrodes having a delta arrangement formed on one of the pair of substrates; a plurality of signal lines formed on the one of the pair of substrates, the signal lines having bent portions; a plurality of scanning lines formed on the one of the pair of substrates, the plurality of scanning lines and signal lines being formed to run along peripheries of the plurality of pixel electrodes so as to cross each other; and a plurality of thin film transistors electrically connected to the plurality of signal lines for controlling potentials of the pixel electrodes, wherein at least one of the plurality of thin film transistors is formed at a position where the distance between two adjacent signal lines of the plurality of signal lines is reduced by the bent portion of at least one of the two adjacent signal lines.

In one embodiment of the invention, the at least one of the plurality of thin film transistors includes at least two thin film transistors coupled to one of the plurality of signal lines, and the at least two thin film transistors are each coupled to one side of the one of the plurality of signal lines.

In another embodiment of the invention, the plurality of pixel electrodes are electrically connected to drain electrodes of the at least one of the plurality of thin film transistors via contact holes formed through a depth of an interlayer insulating film covering the plurality of thin film transistors, the signal lines, and the scanning lines, and the pixel electrodes overlap at least either the scanning lines or the signal lines with the interlayer insulating film interposed therebetween.

In still another embodiment of the invention, source electrodes and drain electrodes of the at least one of the plurality of thin film transistors are oriented substantially perpendicular to the plurality of scanning lines.

In still another embodiment of the invention, two of the at least two thin film transistors adjacent to each other along the one of the plurality of signal lines are identical in size, and the pixel electrodes connected to the two thin film transistors are identical in size.

In still another embodiment of the invention, two of the at least one of the thin film transistors adjacent to each other along one of the plurality of signal lines are identical in size, and the pixel electrodes connected to the two thin film transistors are identical in size.

In still another embodiment of the invention, the pixel electrodes connected to the two thin film transistors correspond to pixels of different respective colors.

In still another embodiment of the invention, an electrode having a potential identical to a potential of a corresponding pixel electrode is formed below each of the pixel electrodes so as to form an overlap portion with the corresponding scanning line.

In still another embodiment of the invention, each of the pixel electrodes overlaps an adjacent one of the scanning lines which receives a scanning signal before the scanning signal is received by another adjacent one of the scanning lines which is electrically connected to the respective pixel electrode via the at least one of the plurality of thin film transistor.

In still another embodiment of the invention, the source electrode of each of the thin film transistors crosses a width of the gate electrode of the thin film transistor, and protrudes from the gate electrode by a distance corresponding to an amount of misalignment between the gate electrode and the source electrode or more.

In still another embodiment of the invention, the at least one of the plurality of thin film transistors includes at least two thin film transistors coupled to one of the plurality of signal lines, and the at least two thin film transistors are alternately formed on both sides of the one of the plurality of signal lines.

Alternatively, the reflective liquid crystal display device of this invention includes: a pair of substrates sandwiching a liquid crystal layer therebetween; a plurality of pixel electrodes formed on one of the pair of substrates; a plurality of signal lines formed on the one of the pair of substrates, the signal lines having extending portions extending in a first direction and bent portions extending in a second direction which is substantially perpendicular to the first direction; a plurality of scanning lines formed on the one of the pair of substrates substantially parallel to the second direction, the plurality of scanning lines and signal lines being formed to run along peripheries of the plurality of pixel electrodes so as to cross each other; and thin film transistors coupled to the plurality of signal lines and formed along a common axis between the bent portions of two adjacent signal lines.

In one embodiment of the invention, the thin film transistors coupled to one of the plurality of signal lines are coupled to one side of the one of the plurality of signal lines.

In another embodiment of the invention, the thin film transistors coupled to one of the plurality of signal lines are alternatively coupled to both sides of the one of the plurality of signal lines.

Thus, according to the present invention, the overlap portion of each pixel electrode with the gate bus line is prevented from extending along a direction parallel to the gate bus line as occurred with the additional pixel portion. As a result, the pattern cycle of the different densities of each color becomes one and a half times as large as the pixel pitch. This makes vertical stripes less visible, thereby improving the display quality.

According to the present invention, the thin film transistors may be formed only on one side of each signal line. With this configuration, even if source electrodes or drain electrodes of the thin film transistors are formed excessively away from or close to the signal lines due to misalignment in the formation process, the characteristics of the thin film transistors adjacent to each other along the signal line can be kept matched.

According to the present invention, the formation of an interlayer insulating film enables the pixel electrodes to overlap at least either the scanning lines or the signal lines, thereby improving the reflection efficiency.

According to the present invention, the source electrode and the drain electrode of each thin film transistor may be formed to be oriented substantially perpendicular to the scanning line. With this configuration, the overlap area of the gate electrode and the source electrode, as well as the overlap area of the gate electrode and the drain electrode, can be fixed even if a misalignment arises during the formation of the thin film transistor.

According to the present invention, two different thin film transistors adjacent to each other along the signal line may be formed to have an identical size, and the corresponding pixel electrodes connected to the two different thin film transistors may be formed to have an identical size. With this configuration, the electrical characteristics, such as the charging ability, of the two different thin film transistors, as well as the sizes of the liquid crystal regions to be driven by the thin film transistors, can be made identical. This allows for uniform display. The size of a thin film transistor as used herein is represented by W/L wherein W is the channel width of the thin film transistor and L is the channel length thereof.

According to the present invention, an electrode having a potential identical to that of the pixel electrode may be formed below each pixel electrode to overlap the scanning line. With this configuration, a larger capacitance is secured at the overlap portion with the scanning line.

According to the present invention, each pixel electrode may overlap one of the adjacent scanning lines which receives a scanning signal before the scanning signal is received by the other one of the scanning lines to which the pixel electrode is electrically connected via the thin film transistor. With this configuration, the pixel electrode has a shape of a larger rectangle.

According to the present invention, the source electrode and the drain electrode of each thin film transistor may be formed to be oriented along the scanning line, and the source electrode may be formed to cross the width of the gate electrode of the thin film transistor to protrude from the gate electrode by an amount corresponding to a misalignment or more. With this configuration, even if a misalignment arises during the formation of the thin film transistor, the overlap area of the gate electrode and the source electrode, as well as the overlap area of the gate electrode and the drain electrode, can be fixed.

Thus, the invention described herein makes possible the advantage of providing a reflective liquid crystal display device where a vertical stripe pattern is not visually recognized and thus the display quality is improved.

These and other advantages of the present invention will become apparent to those skilled in the art upon reading and understanding the following detailed description with reference to the accompanying figures.

BRIEF DESCRIPTION OF THE DRAWINGS

FIG. 11A is a plan view partially illustrating a configuration where TFTs are formed on the right and left sides of a signal line alternately, and FIGS. 11B and 11C are plan views illustrating a variation in the gate-drain capacitance (Cgd) due to misalignment.

DESCRIPTION OF THE PREFERRED EMBODIMENTS

First, the concept of the prevent invention will be described.

Figure 18:
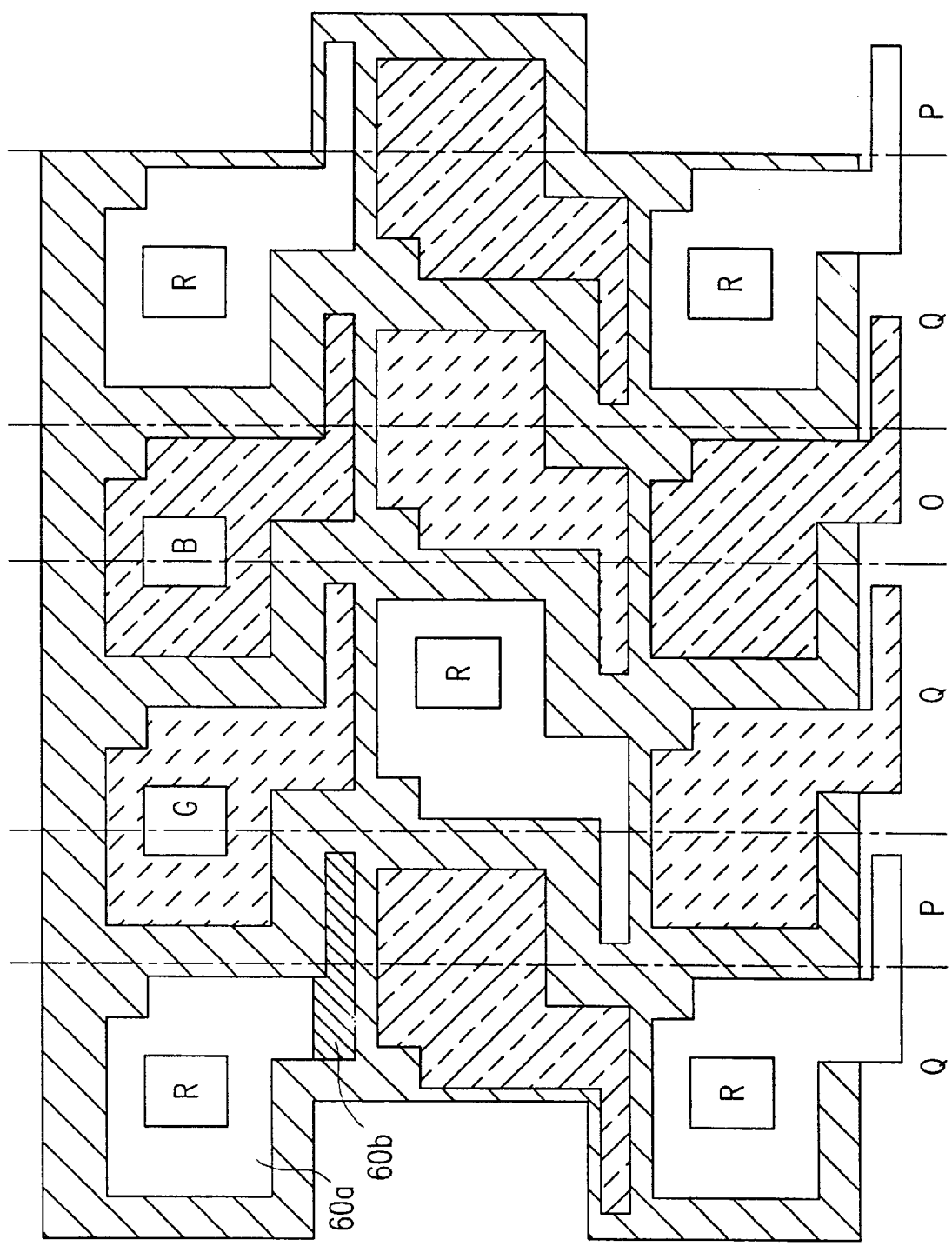
FIG. 18 is a plan view illustrating the actual shape of pixels of the conventional reflective liquid crystal display device.

As described above with respect to the prior art problem, vertical stripes are observed in the conventional display device since the pixel arrangement of each color is such that, when the display region is divided into sections by vertical lines as shown in FIG. 18, the sections have different densities of each color from one another, so that the pattern cycle of different densities is visually recognized.

Figure 1:
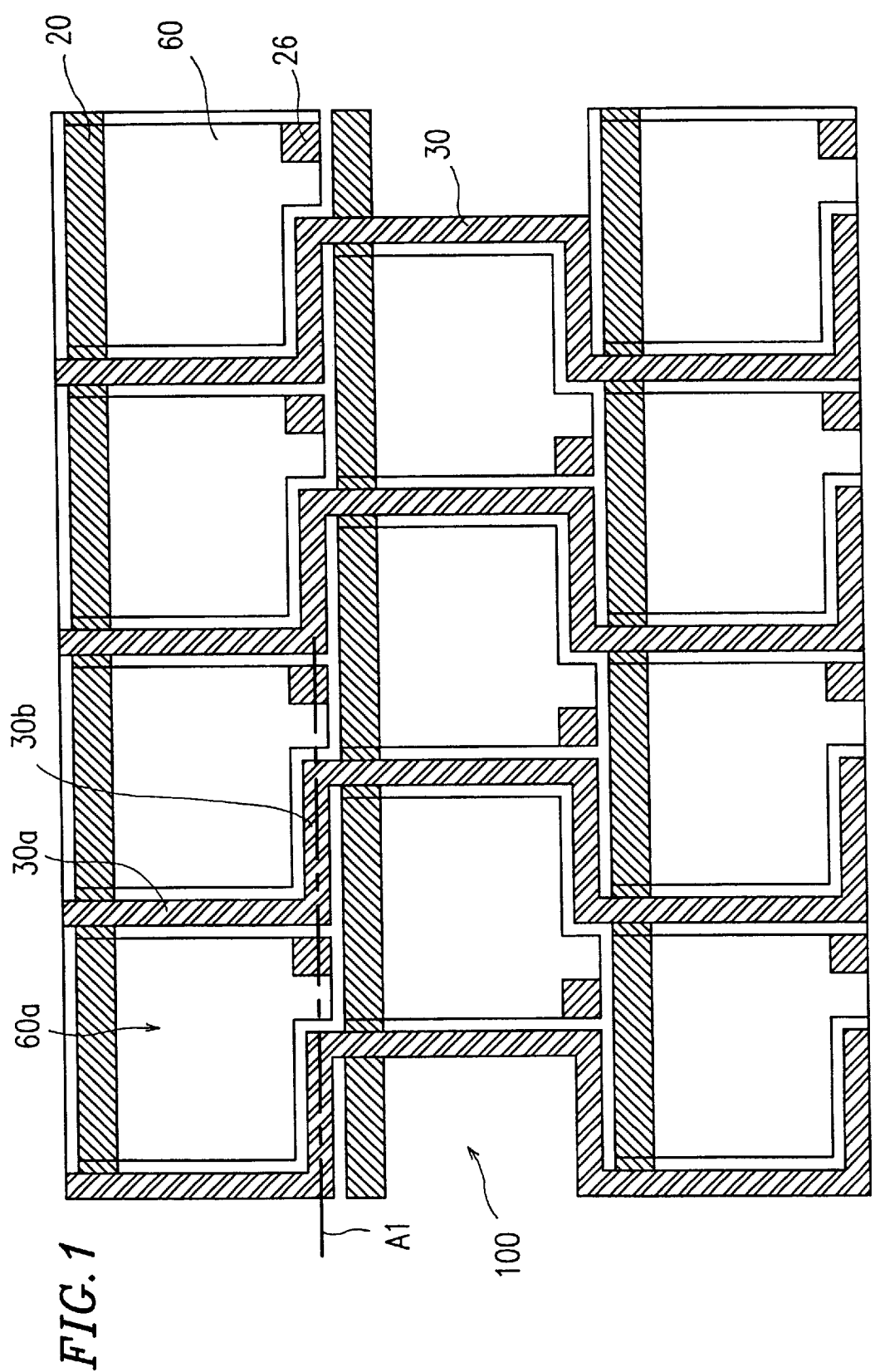
FIG. 1 is a plan view schematically illustrating a reflective liquid crystal display device of Example 1 according to the present invention.
Figure 2:
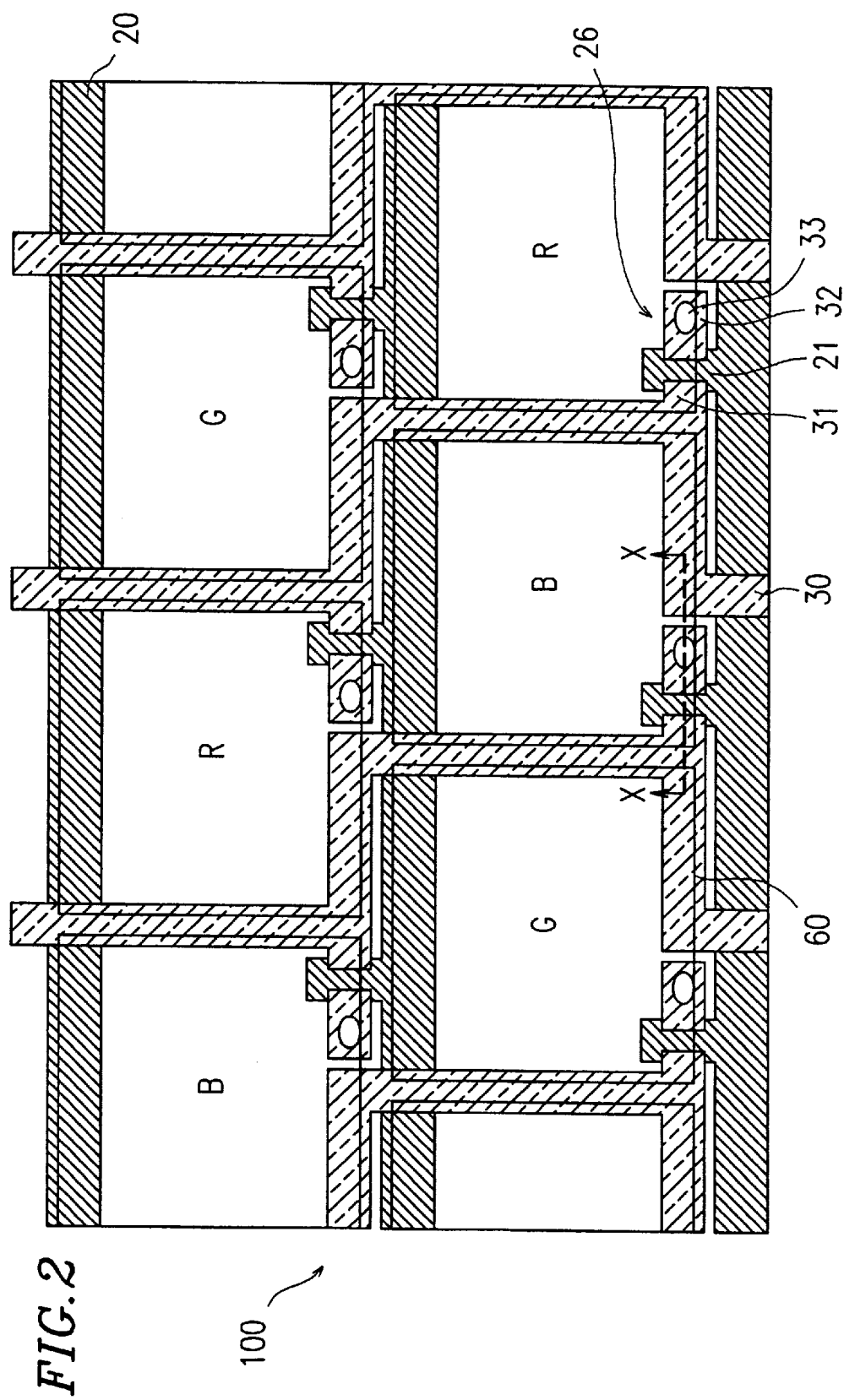
FIG. 2 is a plan view illustrating the reflective liquid crystal display device of FIG. 1 in detail.

FIGS. 1 and 2 illustrate an example of the configuration according to the present invention for solving the above problem, where the position of TFTs 26 is changed. In particular, each pixel electrode 60 is substantially defined by the two adjacent gate bus lines 20 crossing with two adjacent source bus lines 30. In other words, both the gate bus lines 20 and source bus lines 30 are formed about a periphery of each of the pixel electrodes 60. In the present invention, the gate bus lines 20 may also be referred to as scanning lines and the source bus lines 30 may also be referred to as signal lines.

As seen from FIG. 1, the source bus lines 30 include extending portions 30a and bent portions 30b which are substantially perpendicular to the extending portions 30a. Further, the bent portions 30b along a given source bus line 30 is shown to alternatively run in opposite directions. Within each pixel electrode 60, a TFT 26 is formed adjacent the source bus line 30 in a region where the distance between two adjacent signal lines is reduced by the bent portions 30b. In other words, the TFT 26 is formed along a common axis Al between the bent portions 30b of two adjacent source lines 30. By disposing the TFTs 26 at this position, each pixel electrode 60 has a shape substantially similar to a rectangle having a small protruding square.

Figure 3:
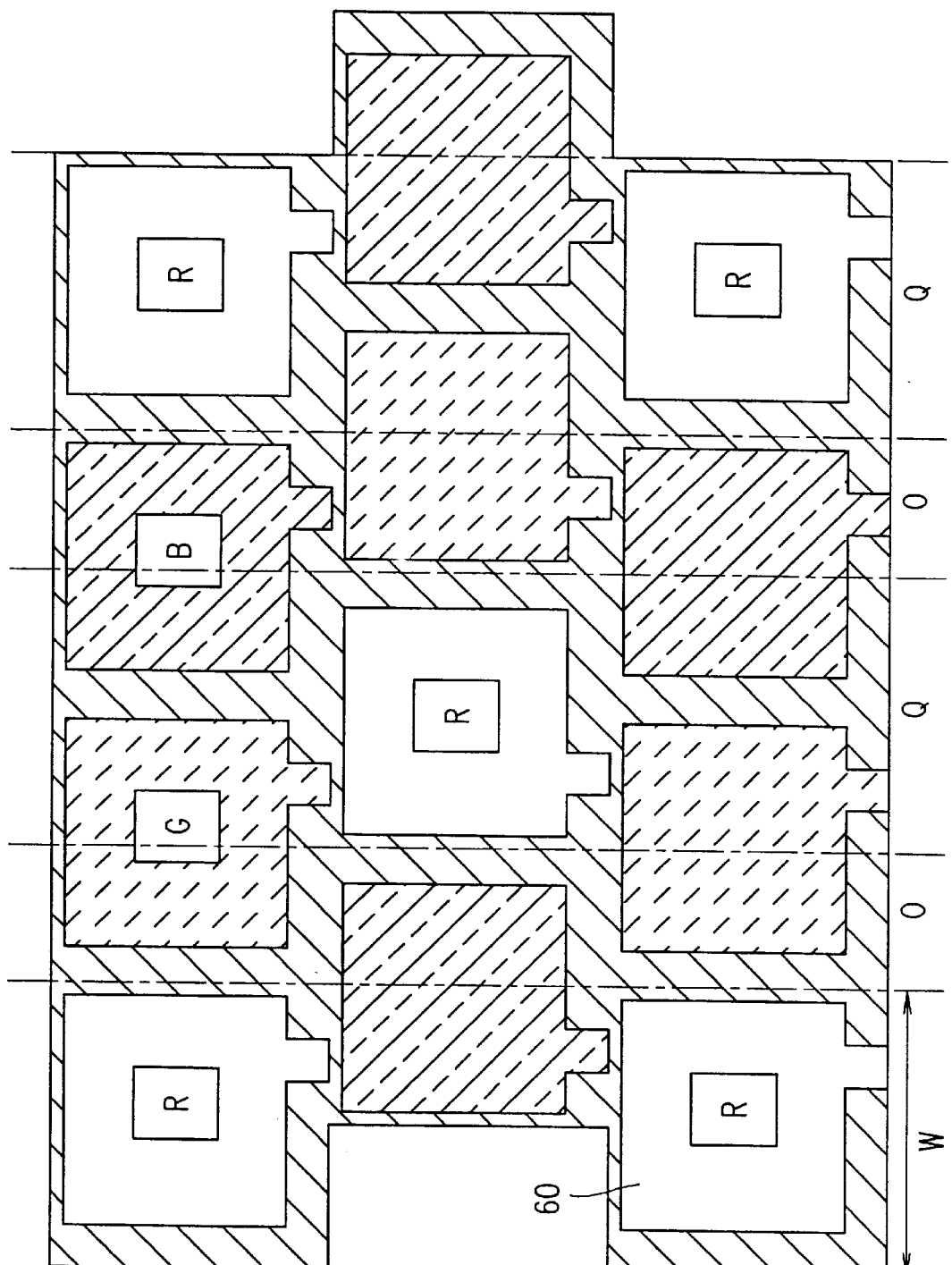
FIG. 3 is a plan view illustrating the shape of pixels of the reflective liquid crystal display device of Example 1.
Figure 19A:
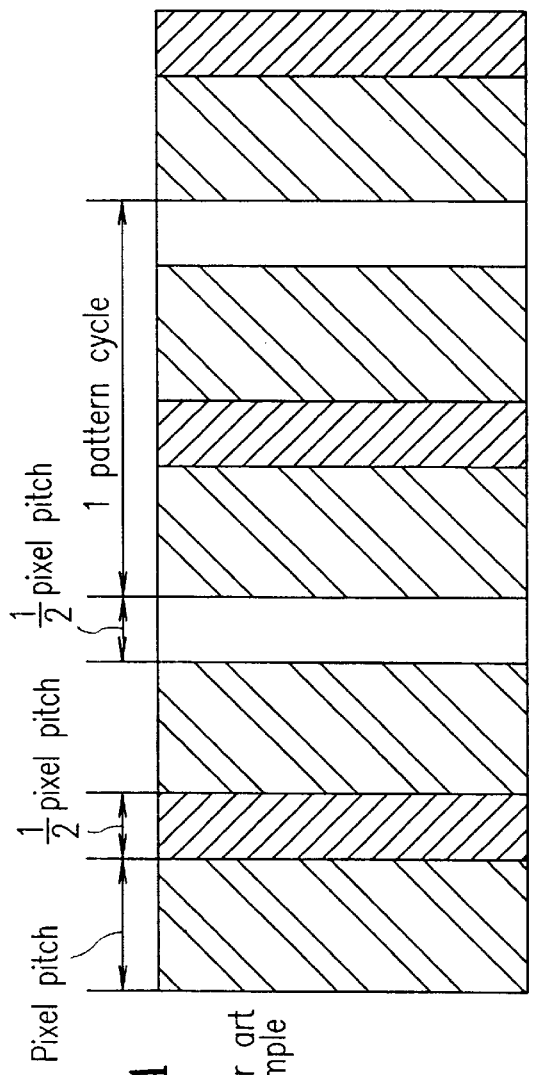
FIGS. 19A and 19B are conceptual views illustrating the color shade distributions of the conventional reflective liquid crystal display device and the reflective liquid crystal display device according to the present invention, respectively.
Figure 19B:
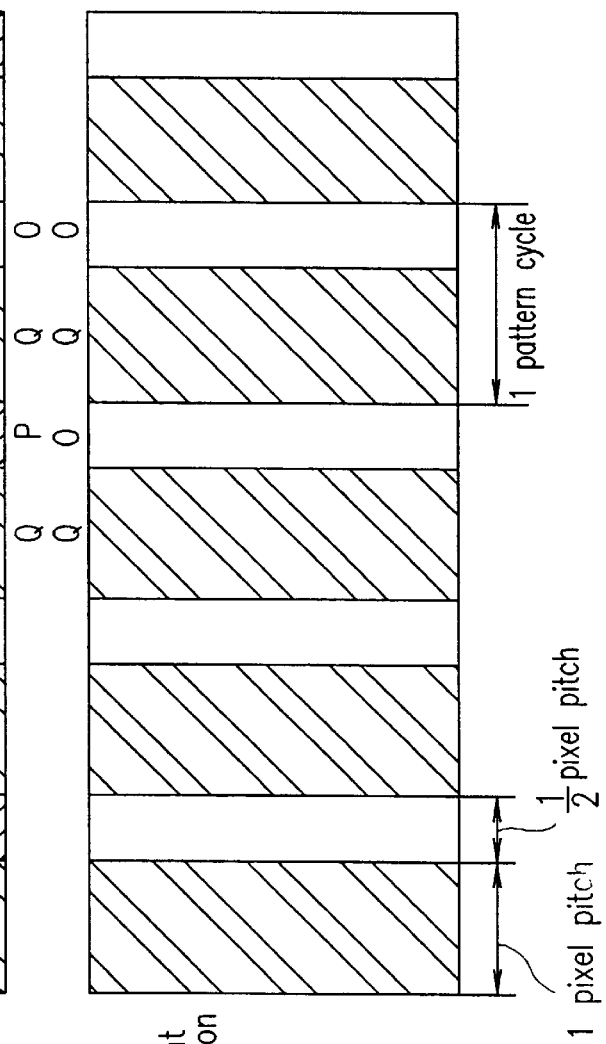

With the above configuration, the overlap portion of each pixel electrode 60 with the gate bus line 20 is prevented from extending along a direction parallel to the gate bus line 20 as occurred with the additional pixel portion 60b shown in FIG. 18. As a result, as shown in FIGS. 3 and 19B, the pattern cycle of the different densities of each color becomes one and a half times as large as the pixel pitch. More specifically, since a section of an intermediate density corresponding to the section P in the conventional case shown in FIG. 18 does not exist in this case, the pitch of color shade is reduced to a half. This makes vertical stripes less visible, thereby improving the display quality.

The position of the TFTs 26 can be altered in various ways as will be described below in examples of the present invention.

Hereinbelow, the present invention will be described by way of example with reference to the relevant drawings.

EXAMPLE 1

In this example, the case where only pixels of the same color are arranged along each source bus line 30 is used to realize pixels having no extended portions.

FIG. 1 is a schematic plan view of a reflective liquid crystal display device 100 of this example. FIG. 2 is a plan view illustrating the reflective liquid crystal display device 100 in more detail. The sectional view taken along line X—X of FIG. 2 is substantially the same as that of FIG. 16. In Figures 1 and 2, the same components as those of the conventional display device shown in FIG. 15 are denoted by the same reference numerals.

Figure 15:
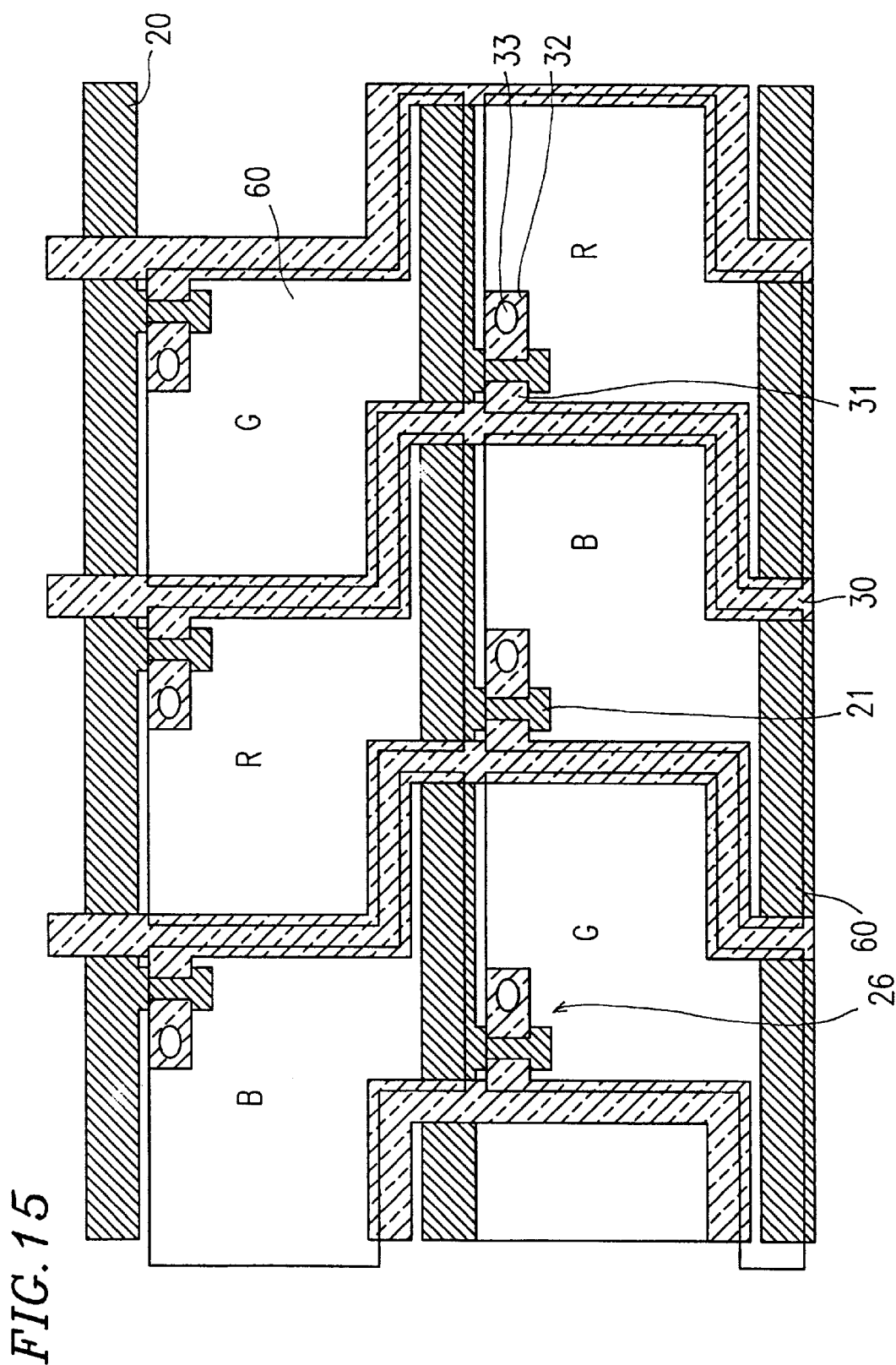
FIG. 15 is a plan view illustrating the reflective liquid crystal display device of FIG. 14 in detail.

In the reflective liquid crystal display device 100 of this example, unlike the TFTs of the conventional display device shown in FIG. 15, each TFT 26 is formed adjacent the source bus line 30 in a region where the bent portions 30b run so as to reduce the distance between adjacent source bus lines 30. In other words, the TFT 26 is formed along a common axis Al between the bent portions 30b of two adjacent source lines 30. Further, as shown in FIG. 1, the TFTs 26 are alternatively arranged on both sides of a given source bus line 30 so that all TFTs of a given source line 30 correspond to a pixel of the same color. In this example, also, the pixel electrode 60 overlaps a gate bus line 20 located on the side opposite to that in the conventional case. For example, as shown in the conventional case of FIG. 15, the pixel electrode 60 overlaps a gate bus line 20 in a lower portion of the electrode region while in the present invention as shown in FIG. 1, the electrode 60 overlaps the a gate bus line 20 in an upper portion of the electrode region.

As a result, the overlap portion of the pixel electrode 60 with the gate bus line 20 is prevented from forming an extending portion which runs parallel to the gate bus line 20. The shape of the resultant pixel as shown in FIG. 3 is substantially rectangular and has no extending portion such as the extending portion 60b shown in FIG. 18. As for the color arrangement, as shown in FIG. 3, since there is no section corresponding to the section P which includes a part of extending portions 60b as shown in FIG. 18, two types of sections Q and O are alternately arranged as shown in FIG. 19B.

Accordingly, in the reflective liquid crystal display device of this example, since the section P does not exist, the pattern cycle of color shade in the lateral direction is reduced to a half of that in the conventional case. That is, it is one and a half times as large as the width W of the pixel region 60. This makes the pitch of the vertical stripe pattern small and thus makes the stripes less visible. Incidentally, each pixel electrode 60 is made to overlap the gate bus line 20 for securing a reflection region as large as possible to enhance the reflectance and thus to obtain bright display.

The process for fabricating the reflective liquid crystal display device of this example will be described with reference to FIGS. 1, 2, and 16.

First, a metal thin film is formed on an insulating substrate. In this example, Ta was deposited on a glass substrate 10 by sputtering to a thickness of 500 nm, and then patterned by photolithography to form the gate bus lines 20 and the gate electrodes 21 of the TFTs 26.

Then, a gate insulating film 40, a semiconductor layer 41, and a contact layer 42 are sequentially formed by plasma chemical vapor deposition (CVD). In this example, $SiN_x$, amorphous Si, and $n^+$-amorphous Si were deposited to thicknesses of 300 nm, 100 nm, and 80 nm, respectively.

The semiconductor layer 41 and the contact layer 42 are then patterned to be at least partially disposed over the gate electrodes 21. The gate insulating film 40 is removed in bus line terminal portions, for example, at the peripheries of the display region of the device, to allow for an electrical contact with the gate bus lines 20.

Ta is then deposited by sputtering and patterned to form the source bus lines 30, source electrodes 31, and drain electrodes 32.

Thereafter, the portions of the contact layers 42 corresponding to channel portions of the TFTs 26 are removed by etching or the like, thereby to complete the TFTs 26. Subsequently, an acrylic photosensitive resin, for example, is applied uniformly to the resultant substrate, and exposed to light and developed, to form an interlayer insulating film 50. At the formation of the interlayer insulating film 50, contact holes 33 are formed through the depth of the interlayer insulating film 50 at the positions above the drain electrodes 32. Simultaneously, contact holes are also formed in the bus line terminal portions. The resultant substrate is then heated to cure the resin.

Al is then deposited by sputtering and patterned to form the pixel electrodes 60. An active matrix substrate is thus completed.

The thus-fabricated active matrix substrate is bonded together with a counter substrate having a color filter and a counter electrode formed thereon with a predetermined space formed therebetween using spacers. A liquid crystal material is then injected into the space and forms a seal therebetween. Thus, the reflective liquid crystal display device is obtained.

Processes such as the formation of the above-mentioned counter substrate and the injection of a liquid crystal material may be performed using known techniques.

EXAMPLE 2

In this example, the storage capacitance (Cs) of the reflective liquid crystal display device of Example 1 is increased.

Figure 4:
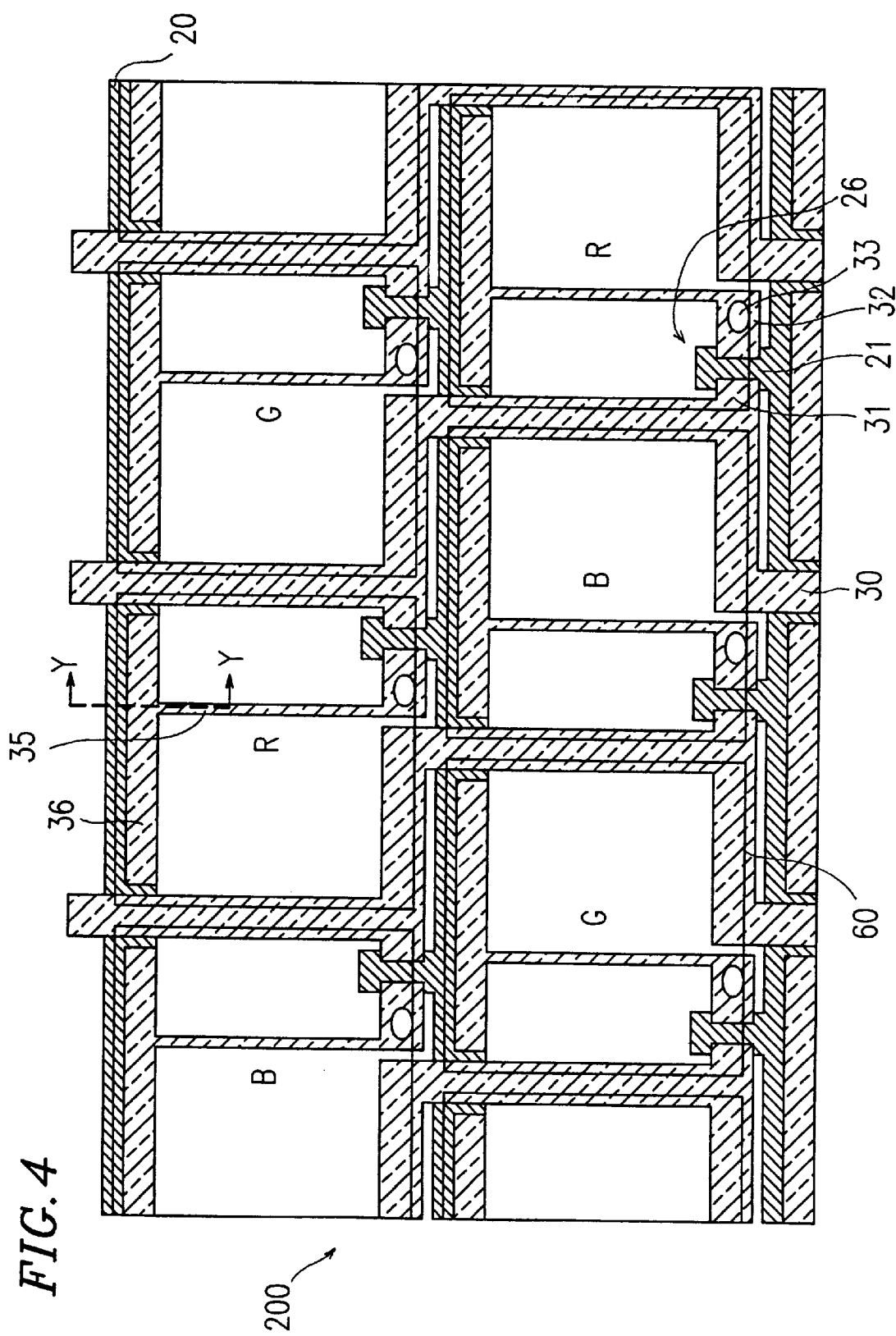
FIG. 4 is a plan view illustrating a reflective liquid crystal display device of Example 2 according to the present invention in detail.
Figure 5:
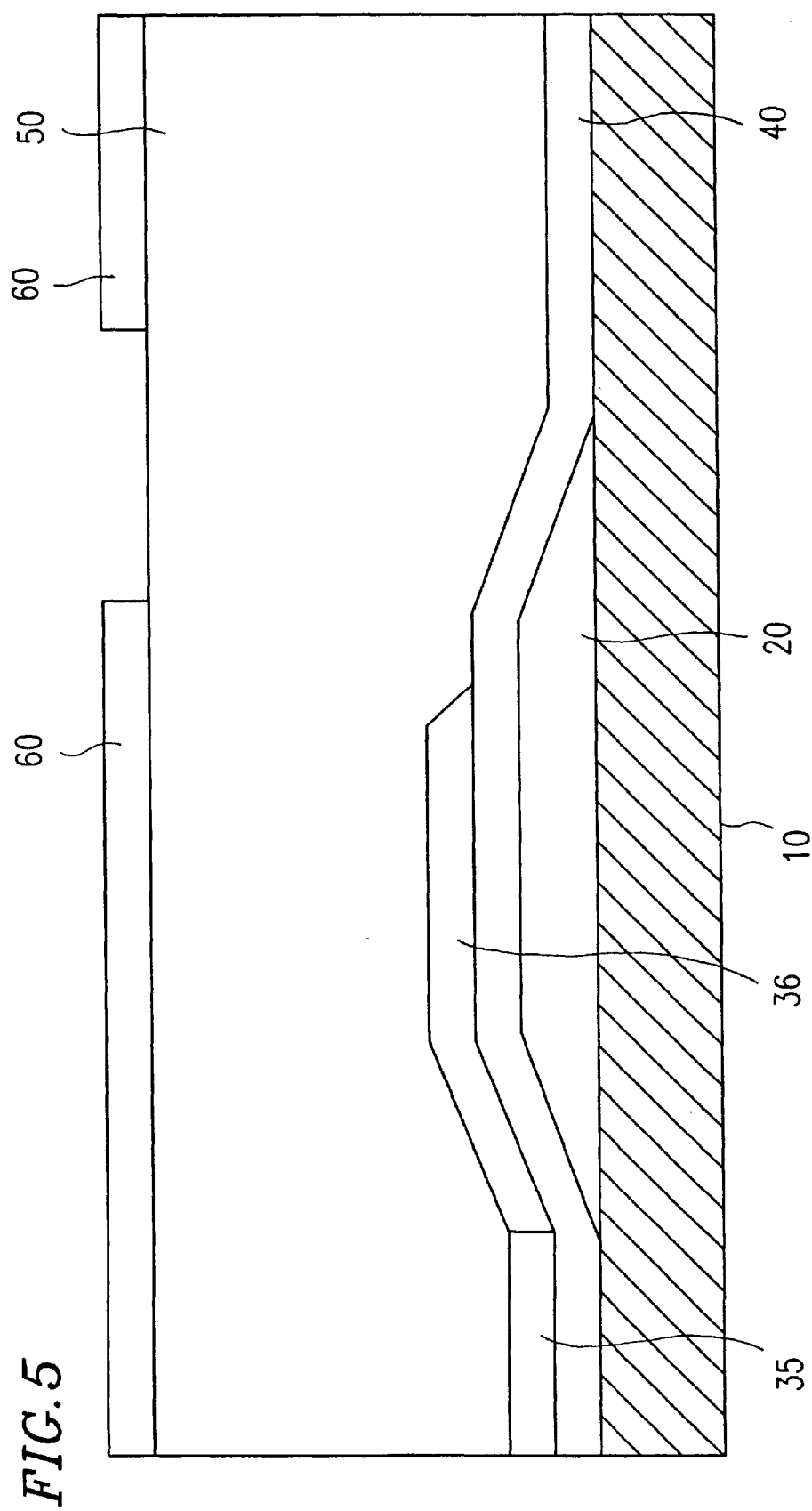
FIG. 5 is a sectional view taken along line Y—Y of FIG. 4.

FIG. 4 is a plan view of a reflective liquid crystal display device 200 of this example. FIG. 5 is a sectional view taken along line Y—Y of FIG. 4. The reflective liquid crystal display device 200 includes overlap portions 36 each of which overlaps the gate bus line 20 and is connected to the drain electrode 32 of the TFT 26 via an extended portion 35.

Figure 16:
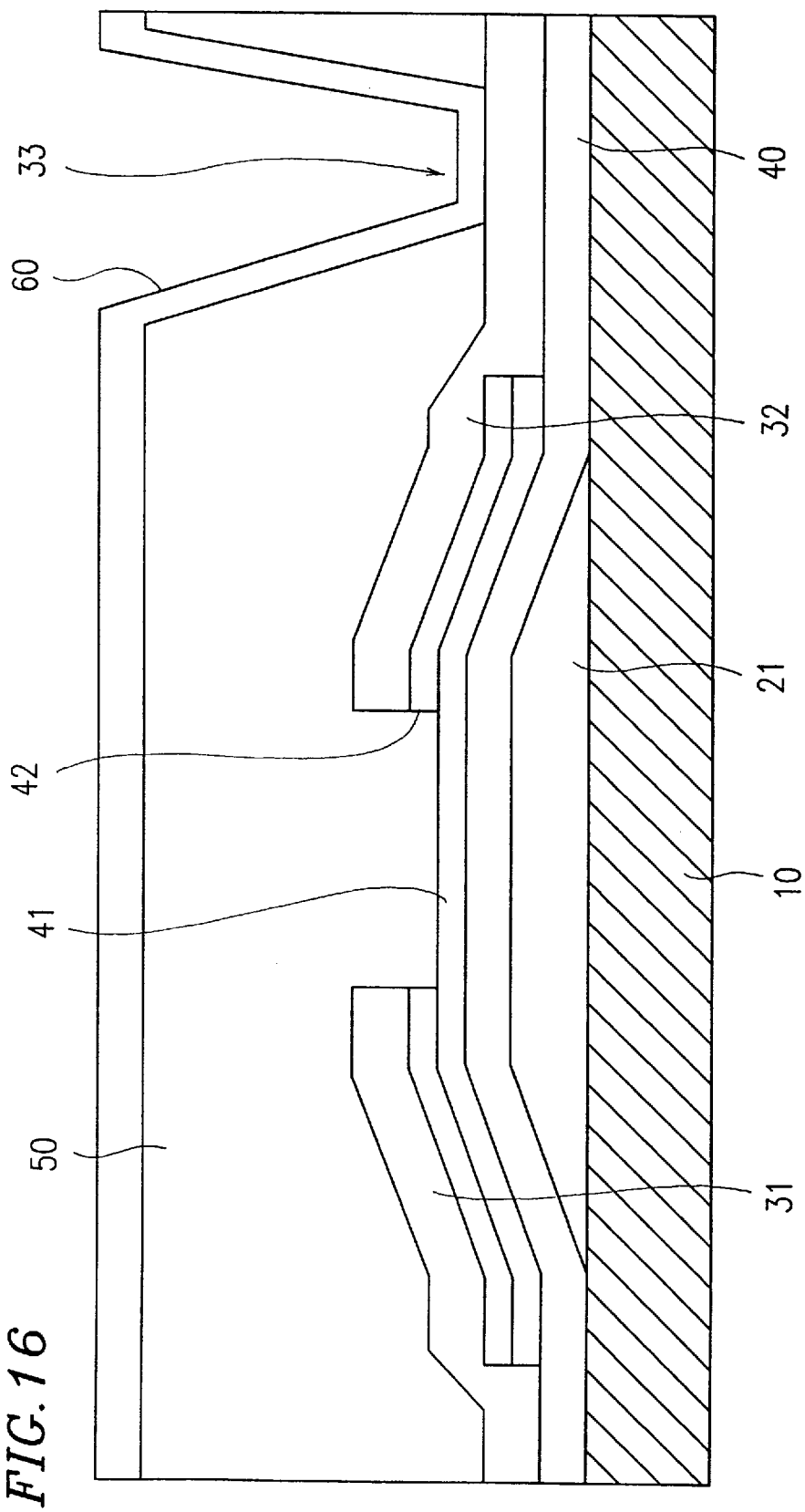
FIG. 16 is a sectional view of a TFT portion which is commonly formed in the conventional reflective liquid crystal display device and the reflective liquid crystal display devices of Examples 1 to 6.
Figure 17:
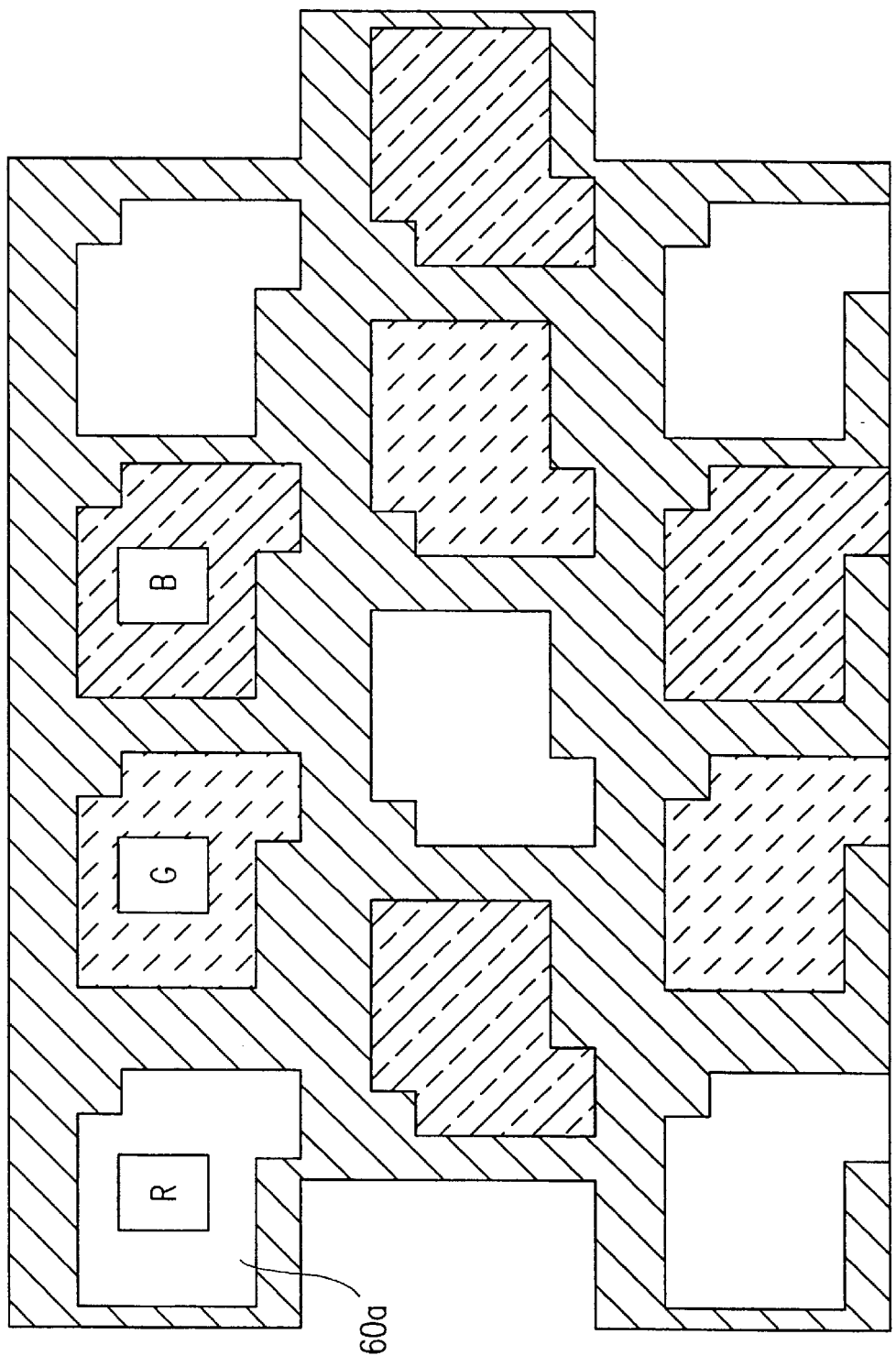
FIG. 17 is a plan view illustrating the shape of pixels of a -conventional reflective liquid crystal display device where no Cs portion is formed.

In Example 1 shown in FIGS. 1 and 16, two insulating films, i.e., the gate insulating film 40 and the interlayer insulating film 50 exist between the gate bus line 20 and the pixel electrode 60 which constitute a storage capacitance. In Example 2, however, as shown in FIG. 5, each storage capacitance is produced between the overlap portion 36 which is electrically connected to the pixel electrode 60 and the gate bus line 20. Since only the gate insulating film 40 exists therebetween, the capacitance in this example is larger compared with that in Example 1 by a value corresponding to the absence of the interlayer insulating film 50. As the value of the storage capacitance is larger the display quality is higher, as long as the driving ability of the TFT permits. Accordingly, in this example, the display quality can be further improved.

EXAMPLE 3

In this example, the case where pixels are in a different arrangement from that in Example 1 will be described.

Figure 8:
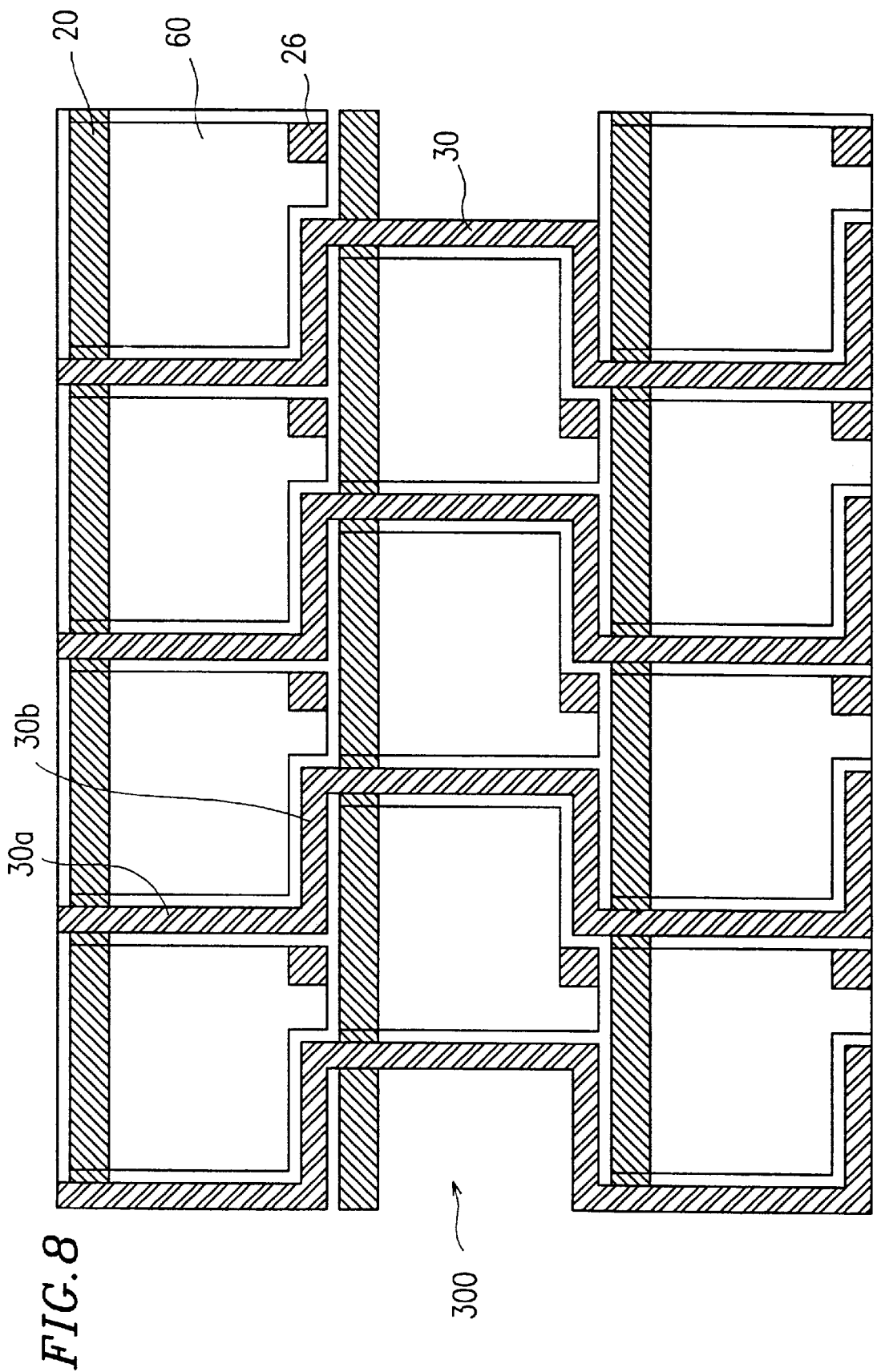
FIG. 8 is a plan view schematically illustrating the reflective liquid crystal display device of Example 3 according to the present invention.
Figure 9:
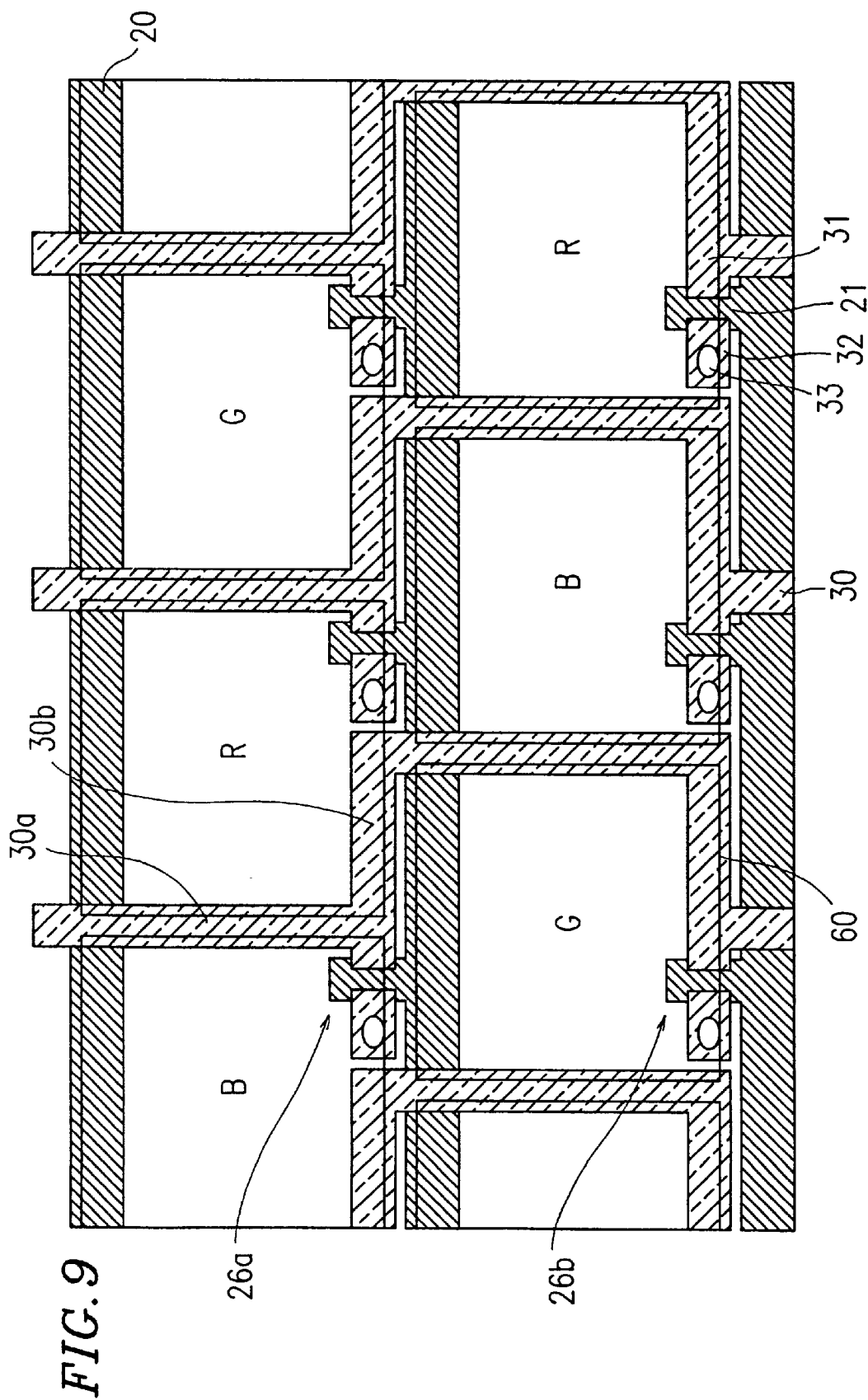
FIG. 9 is a plan view illustrating the reflective liquid crystal display device of Examples 3 and 4 in detail.
Figure 10:
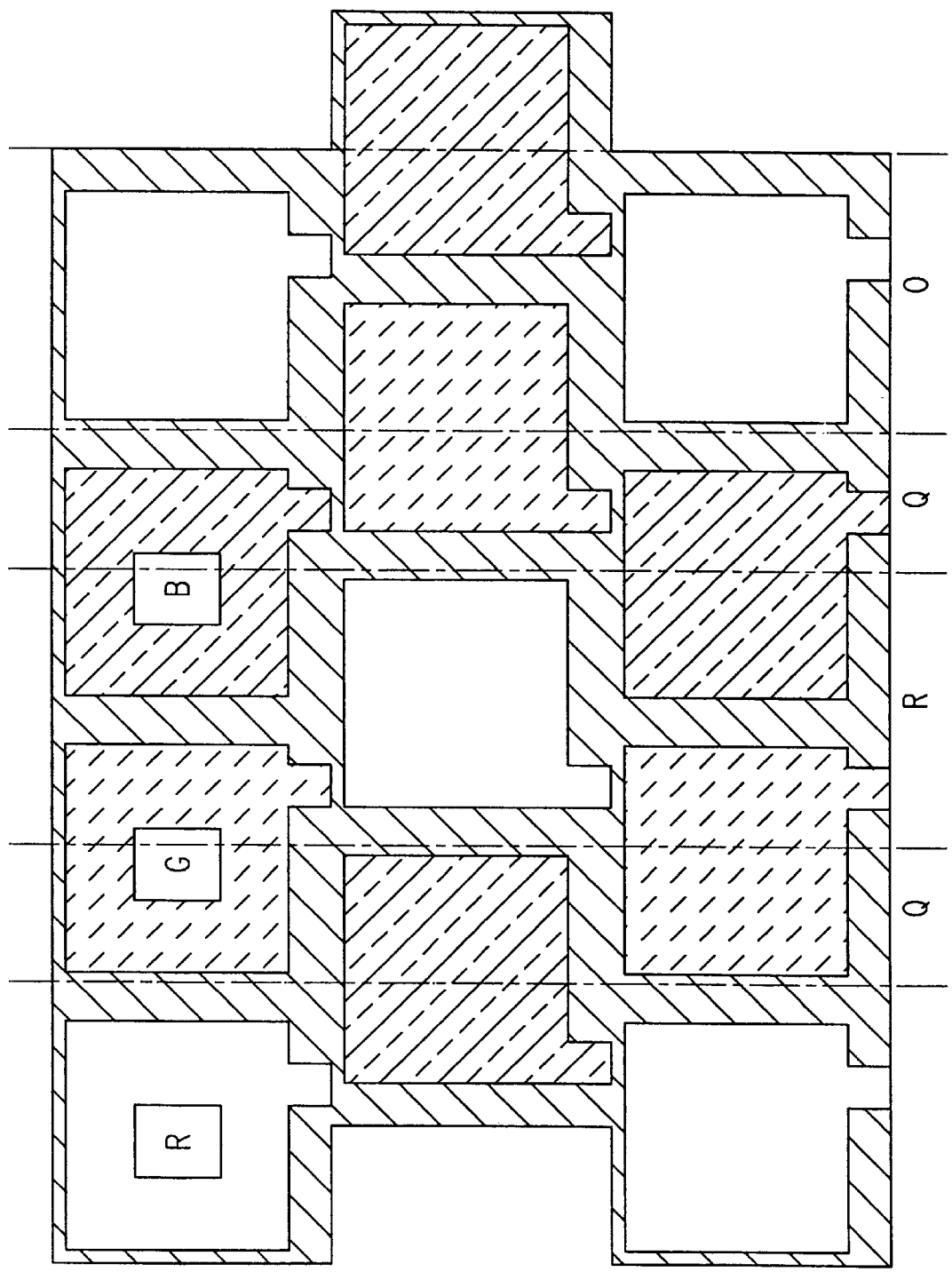
FIG. 10 is a plan view illustrating the shape of pixels of the reflective liquid crystal display device of Example 3.

FIG. 8 is a schematic plan view of a reflective liquid crystal display device 300 of this example. FIG. 9 is a plan view illustrating the reflective liquid crystal display device 300 in more detail.

In the reflective liquid crystal display device 300 of this example, two types of color pixels are alternately arranged on one side of each source bus line 30. The TFTs 26 are formed on only one side of the source bus line 30.

Figure 6:
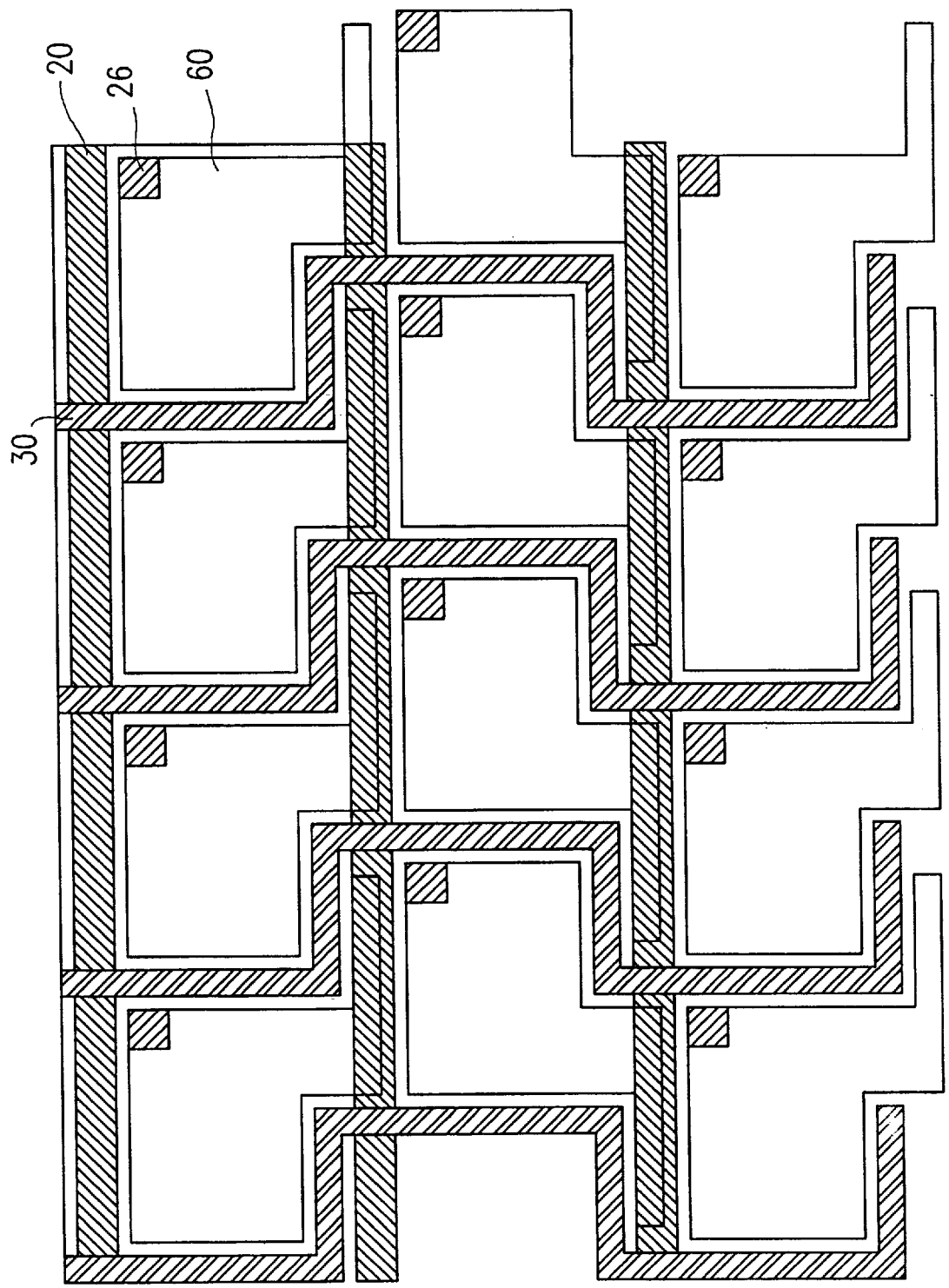
FIG. 6 is a plan view illustrating a comparative example of a reflective liquid crystal display device of Example 3.
Figure 7:
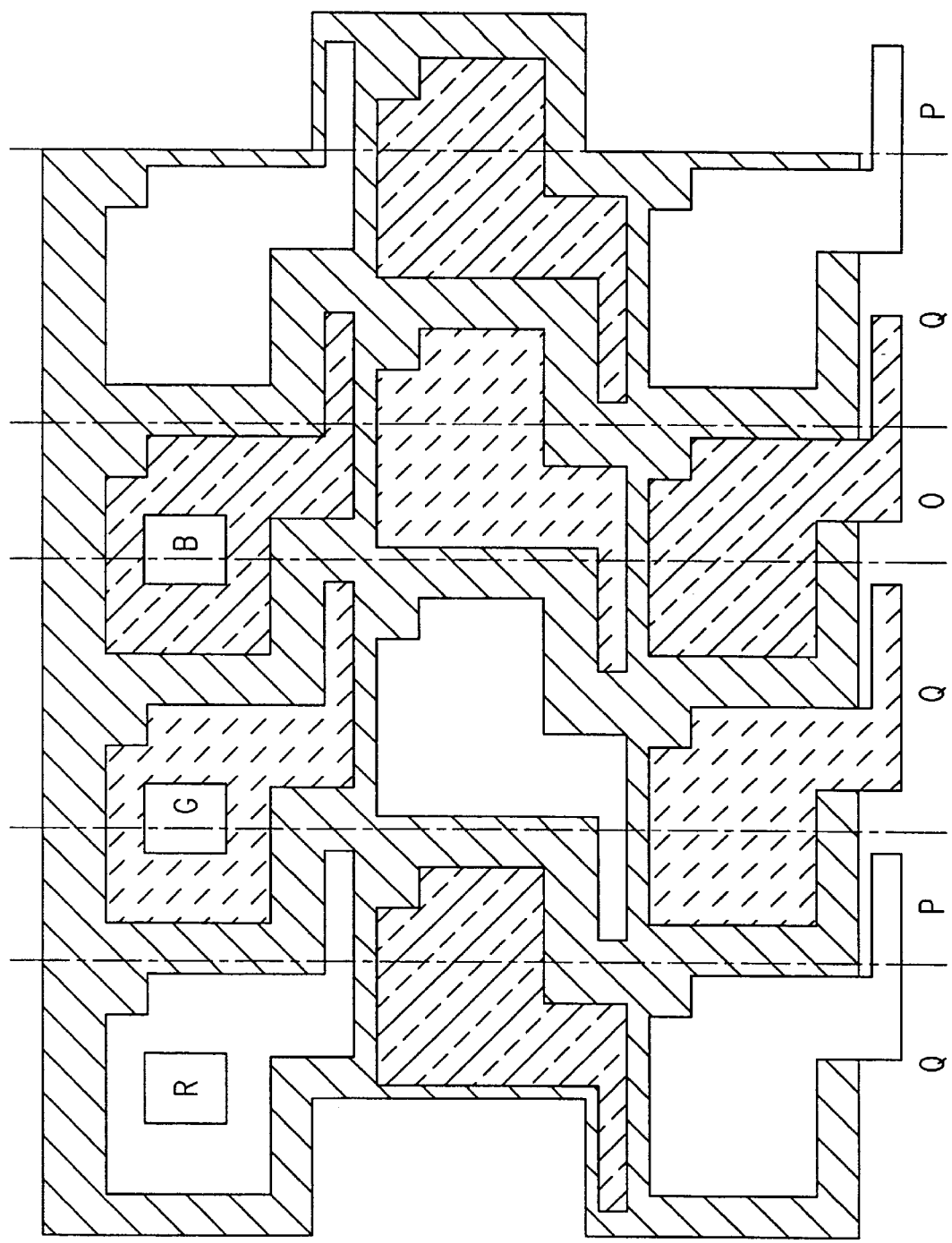
FIG. 7 is a plan view illustrating the shape of pixels of the comparative example of FIG. 6.

The above condition of forming the TFTs 26 on only one side of each source bus line 30 is also satisfied by the case having the TFT arrangement shown in FIG. 6 and the arrangement of color pixels shown in FIG. 7. As is apparent from FIG. 7, this pixel arrangement causes the prior art problem described above.

Thus, in this example, the TFTs 26 are formed at positions shown in FIGS. 8 and 9. That is, each TFT 26 is formed at a position of the pixel region which is narrowed by the bent portion 30b of the source bus line 30. Accordingly, the shape of the pixel region defined by the pixel electrode 60 becomes substantially rectangular.

EXAMPLE 4

In this example, an occurrence of display failure is prevented even if TFTs are positionally deviated in the reflective liquid crystal display devices in Examples 1 and 2.

The configuration of the reflective liquid crystal display device of this example is the same as that shown in FIG. 9.

In the reflective liquid crystal display devices of Examples 1 and 2, in order to have substantially the same shape of pixels over the entire display screen, that is, in consideration of constituting the entire display screen by a pattern of repetition of pixels of substantially the same shape, pixels are arranged on the right and left sides of each source bus line 30 alternately. In this case, naturally, the TFTs 26 are formed on the right and left sides of each source bus line 30 alternately as shown in FIG. 11A. In such a case, when a rightward or leftward misalignment of the source bus lines, the source electrodes, and the drain electrodes occurs at the exposure of a metal for the formation thereof, as shown in FIGS. 11B and 11C, the areas of the overlaps of the source electrode and the drain electrode with the gate electrode vary.

Assume that the area of the overlap of the source electrode with the gate electrode is represented by Sgs and the area of the overlap of the drain electrode with the gate electrode is represented by Sgd. When a leftward misalignment occurs as shown in FIG. 11B, Sgs of TFT-A shown in FIG. 11A increases and Sgd thereof decreases. Conversely, Sgs of TFT-B shown in FIG. 11A decreases and Sgd thereof increases.

This variation in the area of the overlap results in a variation in the gate-drain capacitance (Cgd). Since Cgd is proportional to Sgd, in the above case, Cgd of TFT-A shown in FIG. 11A decreases, and Cgd of TFT-B shown in FIG. 11A increases. Thus, the pixels connected to one source bus line have different values of Cgd alternately, resulting in a variation of an optimal voltage value to be applied to the counter electrode for every pixel, thereby causing an occurrence of flickering and a generation of residual images of the pixels. This decreases the quality of the resultant display screen.

When a rightward misalignment occurs as shown in FIG. 11C, Cgd of TFT-A shown in FIG. 11A increases, and Cgd of TFT-B shown in FIG. 11A decreases, opposite to the above-mentioned case.

In this example, a shape of pixels for solving the above problem is proposed.

FIG. 9 is a plan view of the reflective liquid crystal display device of this example. In this example, in order to avoid a variation in Cgd of the pixels connected to one source bus line, the TFTs 26 are formed only on one side of each source bus line 30. Also, in order to form the TFTs 26 on the side of the pixel regions where the bent portions 30b of the source bus lines 30 run, in this example, two types of TFTs 26a and 26b are formed alternately along the source bus lines 30.

In other words, a set of two types of pixels are repeatedly arranged. More specifically, for the pixels in the upper row as is viewed from FIG. 9, the TFT 26a is formed on the left side opposite to the rightward bent portion 30b of each source bus line 30. For the pixels in the lower row, the TFT 26b is formed on the left side of the leftward bent portion 30b of each source bus line 30.

In this example, also, the TFTs 26a and 26b are formed at positions shown in FIGS. 8 and 9. That is, each of the TFTs 26a and 26b is formed at a position where the bent portion 30b of the source bus line 30 runs so as to reduce the distance between adjacent source bus lines 30. Accordingly, the shape of the pixel region defined by the pixel electrode 60 becomes substantially rectangular.

In the pixel arrangements shown in FIGS. 1 and 4, a set of one pixel and a pixel of a laterally inverted version of the former pixel constitute a unit of a repetition pattern. Accordingly, all of the pixels can be fabricated by designing only one pixel. In this example, the designing of one set composed of two types of pixels adjacent to each other along the source bus line 30 is required to fabricate all of the pixels. Actually, the two types of pixels were designed so that they have substantially the same area of the pixel electrodes and substantially the same size of the TFTs. In particular, the TFTs 26a and 26b were designed to have the same size. Such a reflective liquid crystal display device was actually fabricated for trial and the display states of the device were evaluated. During the trial, neither vertical stripes nor an occurrence of flickering or a generation of residual images were observed. No display failure specifically caused by the configuration of this example was detected, either.

EXAMPLE 5

Figure 12A:
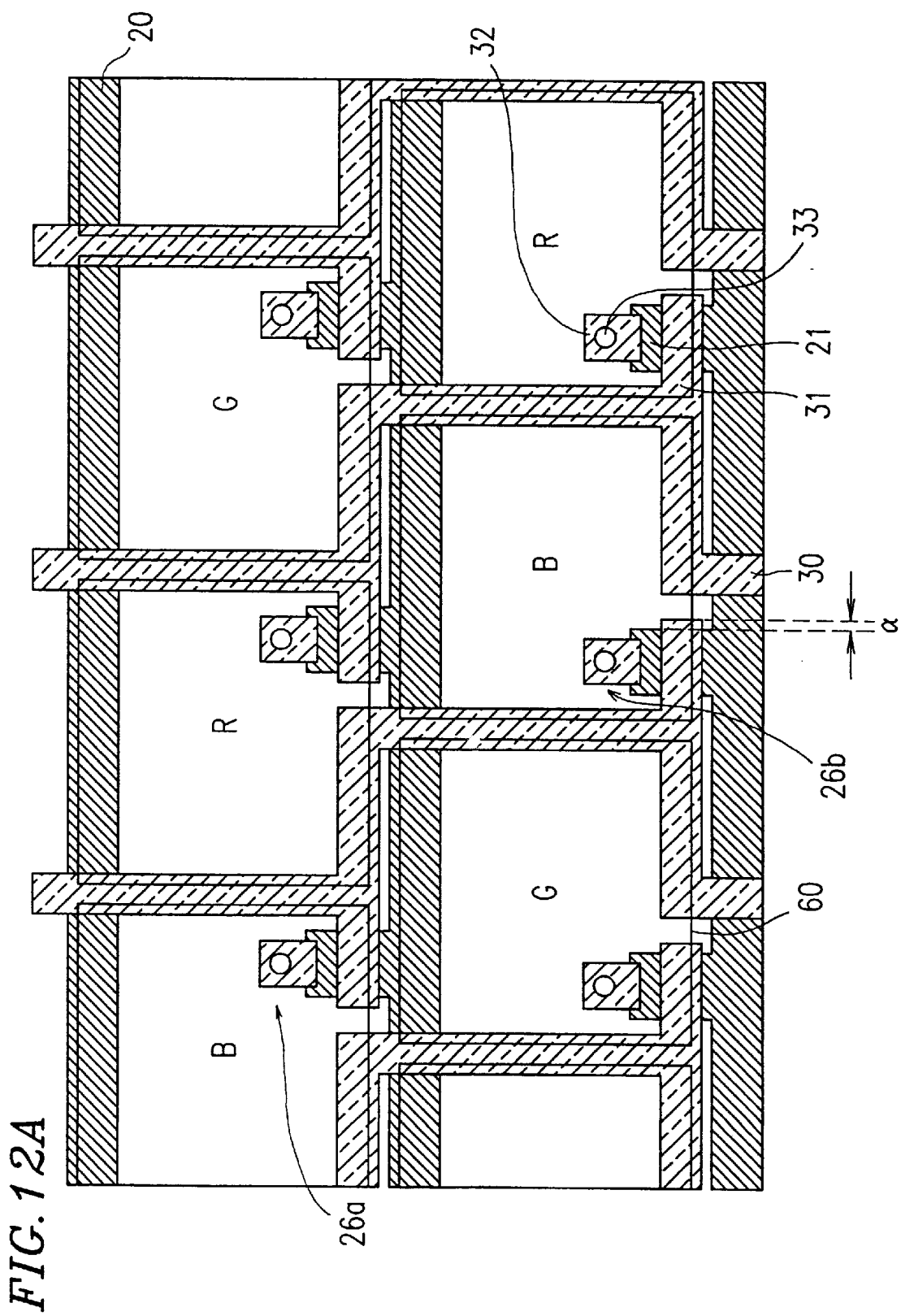
FIGS. 12A and 12B are plan views illustrating reflective liquid crystal display devices of Example 5 according to the present invention in detail.
Figure 12B:
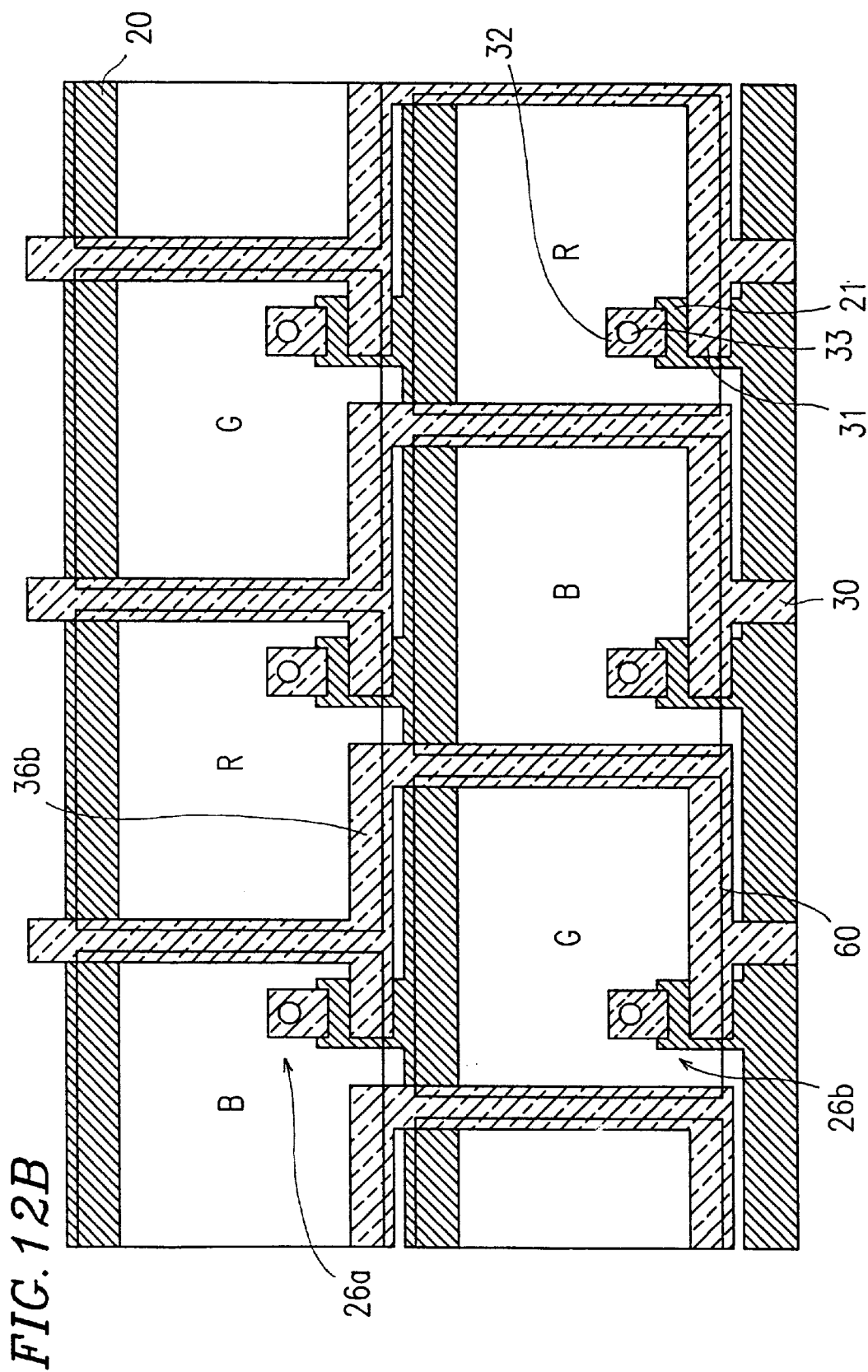

FIGS. 12A and 12B are plan views of modified examples of the reflective liquid crystal display devices of Examples 1 and 4, respectively. In these modified examples, the orientation of the arrangement of the source electrode 31 and the drain electrode 32 of each TFT 26 is made substantially perpendicular to the gate bus line 20. In the case of FIG. 12B, the TFTs 26a and 26b are formed only on one side of each source bus line 30 as in Example 4. Therefore, the effect of preventing a variation in the gate-drain capacitance in each pixel due to a misalignment is obtained as in Example 4.

In the case of FIG. 12A, the TFTs 26a and 26b are formed on the right and left sides of each source bus line 30 alternately. In consideration of the misalignment described above, the source electrode 31 of each of the TFTs 26a and 26b extending from the source bus line 30 is made to protrude from the gate electrode 21 of the TFT after crossing the width thereof by a length corresponding to an amount of misalignment or larger. That is, the source electrode 31 is made to protrude from the gate electrode 21 by a length d shown in FIG. 12A as an alignment margin. With this configuration, substantially the same effect as that obtained in Example 4 is obtained.

EXAMPLE 6

Figure 13:
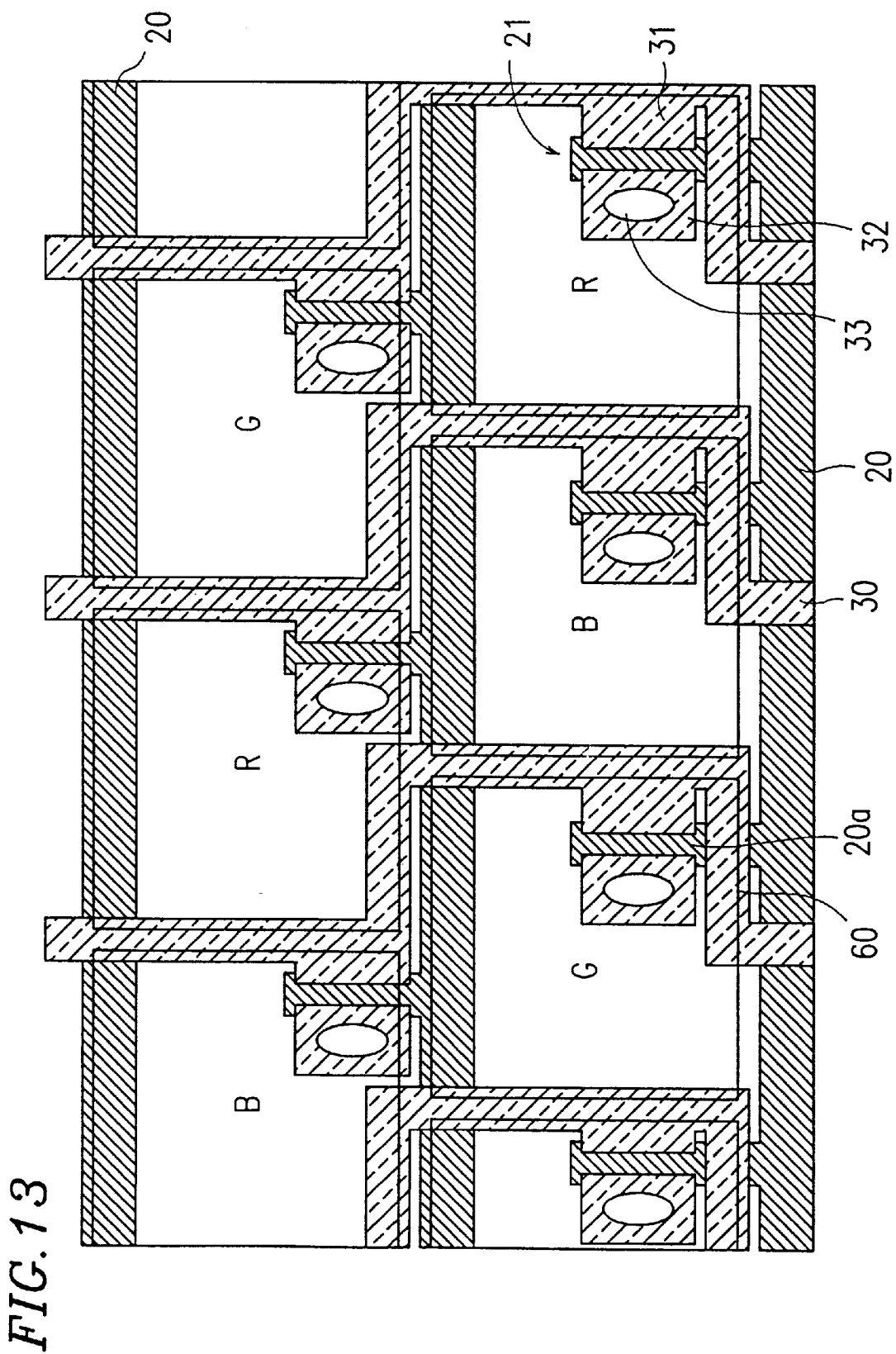
FIG. 13 is a plan view illustrating a reflective liquid crystal display device of Example 6 according to the present invention in detail.
Figure 14:
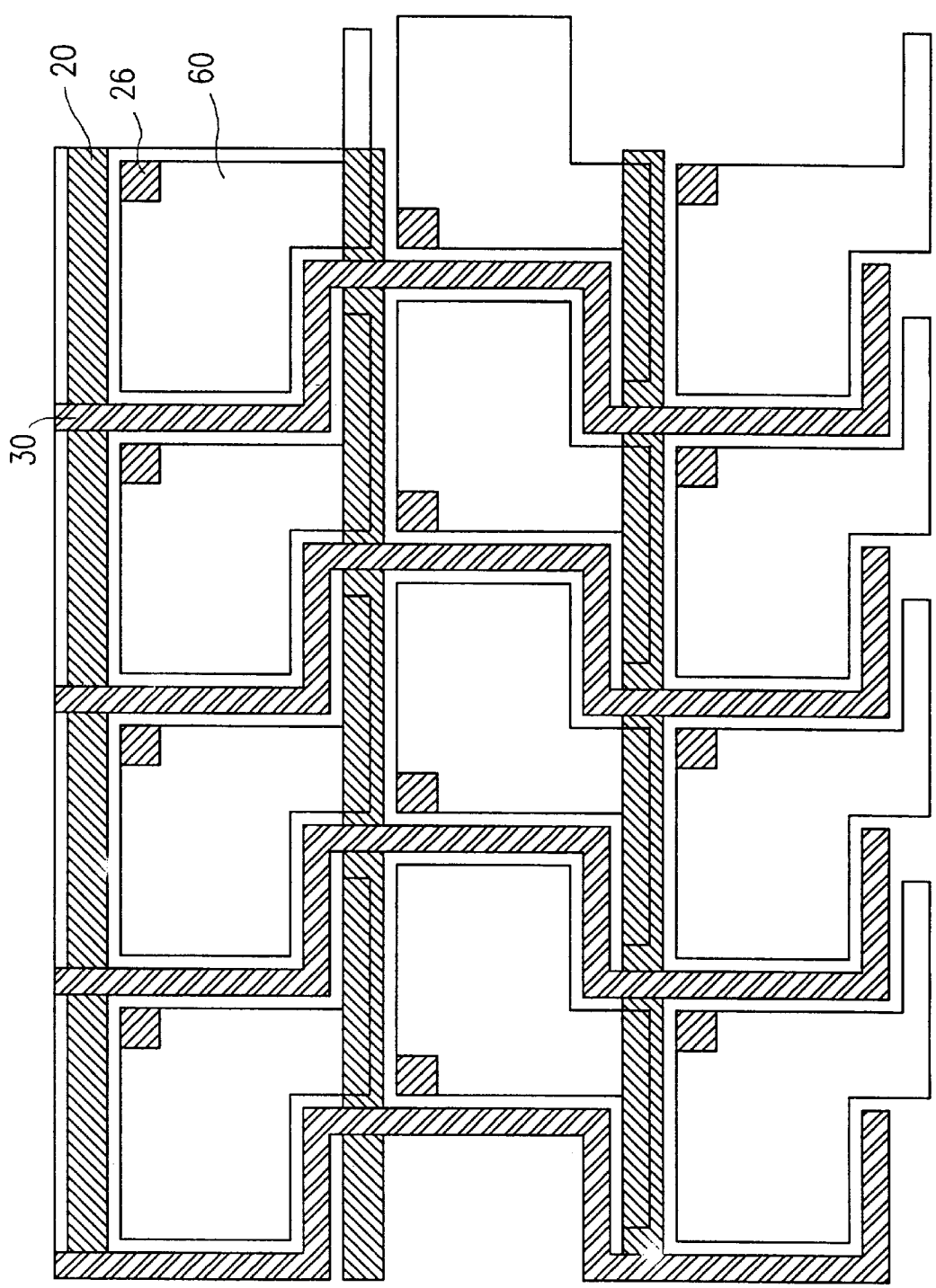
FIG. 14 is a plan view schematically illustrating a conventional reflective liquid crystal display device.

FIG. 13 is a plan view of the reflective liquid crystal display device of this example.

The reflective liquid crystal display device of this example is the same as Example 4 in the basic concept, but different in the position and the structure of the TFTs.

In Example 4, each TFTs 26b in the lower row as is viewed from FIG. 9 is formed on the left side of the leftward bent portion 30b of the source bus line 30. In Example 6, the TFTs 26b in the lower row as is viewed from FIG. 13 are formed at substantially the same position as that of the TFTs 26a in the upper row, i.e., in the lower right corners of the pixel electrodes 60.

Each of the TFTs 26b can be formed at the above position in the following manner: A protrusion 20a of the gate bus line 20 is extended so that the source bus line 30 crosses the protrusion 20a, i.e., the gate electrode 21, and the source electrode 31 and the drain electrode 32 are formed on the top portion of the protrusion 20a.

In Examples 1 to 6 described above, the interlayer insulating film 50 is formed as shown in FIG. 16 so that the size of the pixel electrodes 60 can be made large. A structure having no interlayer insulating film is also possible.

In the above case of having no interlayer insulating film, in order to prevent the pixel electrodes 60 from being in electrical contact with the source bus lines 30, the pixel electrodes 60 must be formed apart from the source bus lines 30 in the direction parallel to the substrate surface. Moreover, the overlapping of the pixel electrodes 60 with the TFTs 26 is not possible. This reduces the area of each pixel electrode 60, and thus reduces the reflection efficiency. In this case, however, a value of the storage capacitance equal to that obtained in Example 2 can be obtained only by overlapping the pixel electrodes 60 on the gate bus lines 20. Thus, this structure is advantageous in that the same storage capacitance can be obtained with the structure simpler than that of Example 2.

Thus, according to the reflective liquid crystal display device of the present invention, vertical stripes are substantially prevented from being observed on the display screen, and thus the display quality is improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflective liquid crystal display device comprising:
   a pair of substrates sandwiching a liquid crystal layer therebetween;
   a plurality of pixel electrodes having a delta arrangement formed on one of the pair of substrates;
   a plurality of signal lines formed on the one of the pair of substrates, the signal lines having bent portions;
   a plurality of scanning lines formed on the one of the pair of substrates, the plurality of scanning lines and signal lines being formed to run along peripheries of the plurality of pixel electrodes so as to cross each other;
   a plurality of thin film transistors electrically connected to the plurality of signal lines for controlling potentials of the pixel electrodes;
   wherein at least one of the plurality of thin film transistors is formed at a position where the distance between two adjacent signal lines of the plurality of signal lines is reduced by the bent portion of at least one of the two adjacent signal lines; and
   wherein the at least one of the plurality of thin film transistors includes at least two thin film transistors coupled to one of the plurality of signal lines, and the at least two thin film transistors are each coupled to one side of the one of the plurality of signal lines so that all transistors coupled to the one of the plurality of signal lines are coupled to one side of that one signal line.

2. A reflective liquid crystal display device according to claim 1, wherein the plurality of pixel electrodes are electrically connected to drain electrodes of the thin film transistors via contact holes formed through a depth of an interlayer insulating film covering the thin film transistors, the signal lines, and the scanning lines, and the pixel electrodes overlap at least either the scanning lines or the signal lines with the interlayer insulating film interposed therebetween.

3. A reflective liquid crystal display device according to claim 2, wherein a respective electrode having a potential identical to a potential of a corresponding pixel electrode is formed below each of the pixel electrodes so as to form an overlap portion with a corresponding scanning line.

4. A reflective liquid crystal display according to claim 1, wherein source electrodes and drain electrodes of the two thin film transistors are oriented substantially perpendicular to scanning lines.

5. A reflective liquid crystal display device according to claim 4, wherein two of the thin film transistors adjacent to each other along one of the plurality of signal lines are identical in size, and the pixel electrodes connected to the two thin film transistors are identical in size.

6. A reflective liquid crystal display device according to claim 4, wherein the source electrode of each of the thin film transistors crosses a width of the gate electrode of each respective thin film transistor, and protrudes from the gate electrode by a distance corresponding to an amount of misalignment between the gate electrode and the source electrode or more.

7. A reflective liquid crystal display device according to claim 1, wherein two of the at least two thin film transistors adjacent to each other along the one of the plurality of signal lines are identical in size, and the pixel electrodes connected to the two thin film transistors are identical in size.

8. A reflective liquid crystal display device according to claim 7, wherein the pixel electrodes connected to the two thin film transistors correspond to pixels of different respective colors.

9. A reflective liquid crystal display device according to claim 1, wherein each of the pixel electrodes overlaps an adjacent one of the scanning lines which receives a scanning signal before the scanning signal is received by another adjacent one of the scanning lines which is electrically connected to the respective pixel electrode via the at least one of the plurality of thin film transistors.

10. A reflective liquid crystal display device comprising:
    a pair of substrates sandwiching a liquid crystal layer therebetween;
    a plurality of reflective pixel electrodes having a delta arrangement formed on one of the pair of substrates;
    a plurality of signal lines formed on the one of the pair of substrates, the signal lines having bent portions;
    a plurality of scanning lines formed on the one of the pair of substrates, the plurality of scanning lines and signal lines being formed to run along peripheries of the plurality of reflective pixel electrodes so as to cross each other;

a plurality of thin film transistors electrically connected to the plurality of signal lines for controlling potentials of the reflective pixel electrodes;

wherein at least one of the plurality of thin film transistors is formed at a position where the distance between two adjacent signal lines of the plurality of signal lines is reduced by the bent portion of at least one of the two adjacent signal lines; and wherein each of the reflective pixel electrodes overlaps an adjacent one of the scanning lines which receives a scanning signal before the scanning signal is received by another adjacent one of the scanning lines which is electrically connected to the respective reflective pixel electrode via the at least one of the plurality of thin film transistors.

11. A reflective liquid crystal display according to claim 10, wherein the at least one of the plurality of thin film transistors includes at least two thin film transistors coupled to one of the plurality of signal lines, and the at least two thin film transistors are alternately formed on both sides of the one of the plurality of signal lines.

12. A reflective liquid crystal display device according to claim 10, wherein the at least one of the plurality of thin film transistors includes at least two thin film transistors coupled to one of the plurality of signal lines, and the at least two thin film transistors are each coupled to one side of the one of the plurality of signal lines; and wherein two of the at least two thin film transistors adjacent to each other along the one of the plurality of signal lines are identical in size, and the pixel electrodes connected to the two thin film transistors are identical in size.

13. A reflective liquid crystal display device according to claim 12, wherein the pixel electrodes connected to the two thin film transistors correspond to pixels of different respective colors.

14. A reflective liquid crystal display device according to claim 10, wherein the plurality of pixel electrodes are electrically connected to drain electrodes of the thin film transistors via contact holes formed through a depth of an interlayer insulating film covering the thin film transistors, the signal lines, and the scanning lines, and the pixel electrodes overlap at least either the scanning lines or the signal lines with the interlayer insulating film interposed therebetween.

15. A reflective liquid crystal display device according to claim 14, wherein a respective electrode having a potential identical to a potential of a corresponding pixel electrode is formed below each of the pixel electrodes so as to form an overlap portion with a corresponding scanning line.

16. A reflective liquid crystal display according to claim 10, wherein source electrodes and drain electrodes of the at least one of the plurality of thin film transistors are oriented substantially perpendicular to the plurality of scanning lines.

17. A reflective liquid crystal display device according to claim 16, wherein two thin film transistors adjacent to each other along one of the plurality of signal lines are identical in size, and the pixel electrodes connected to the two thin film transistors are identical in size.

18. A reflective liquid crystal display device according to claim 16, wherein the source electrode of each of the thin film transistors crosses a width of the gate electrode of the respective thin film transistor, and protrudes from the gate electrode by a distance corresponding to an amount of misalignment between the gate electrode and the source electrode or more.

19. The reflective liquid crystal display of claim 10, wherein each of a plurality of the signal lines is connected to a plurality of different colored pixels.

20. A reflective liquid crystal display device comprising:

a pair of substrates sandwiching a liquid crystal layer therebetween;

a plurality of pixel electrodes formed on one of the pair of substrates;

a plurality of signal lines formed on the one of the pair of substrates, the signal lines having bent portions;

a plurality of scanning lines formed on the one of the pair of substrates, the plurality of scanning lines and signal lines being formed to run along peripheries of the plurality of pixel electrodes so as to cross each other;

a plurality of thin film transistors electrically connected to the plurality of signal lines for controlling potentials of the pixel electrodes;

wherein at least one of the plurality of thin film transistors is formed at a position where the distance between two adjacent signal lines of the plurality of signal lines is reduced by the bent portion of at least one of the two adjacent signal lines; and wherein the plurality of pixel electrodes are reflective and are electrically connected to drain electrodes of the thin film transistors via contact holes formed through a depth of an interlayer insulating film covering the plurality of thin film transistors, the signal lines, and the scanning lines, and the pixel electrodes overlap at least one of the scanning lines and the signal lines with the interlayer insulating film interposed therebetween.

21. A reflective liquid crystal display device according to claim 20, wherein the at least one of the plurality of thin film transistors includes at least two thin film transistors coupled to one of the plurality of signal lines, and the at least two thin film transistors are each coupled to one side of the one of the plurality of signal lines; and wherein two of the at least two thin film transistors adjacent to each other along the one of the plurality of signal lines are identical in size, and the pixel electrodes connected to the two thin film transistors are identical in size.

22. A reflective liquid crystal display device according to claim 21, wherein the pixel electrodes connected to the two thin film transistors correspond to pixels of different respective colors.

23. A reflective liquid crystal display device according to claim 20, wherein a respective electrode having a potential identical to a potential of a corresponding pixel electrode is formed below each of the pixel electrodes so as to form an overlap portion with a corresponding scanning line.

24. A reflective liquid crystal display according to claim 20, wherein source electrodes and drain electrodes of the at least one of the plurality of thin film transistors are oriented substantially perpendicular to the plurality of scanning lines.

25. A reflective liquid crystal display device according to claim 24, wherein two thin film transistors adjacent to each other along one of the plurality of signal lines are identical in size, and the pixel electrodes connected to the two thin film transistors are identical in size.

26. A reflective liquid crystal display device according to claim 24, wherein the source electrode of each of the thin film transistors crosses a width of the gate electrode of the respective thin film transistor, and protrudes from the gate electrode by a distance corresponding to an amount of misalignment between the gate electrode and the source electrode or more.

27. A reflective liquid crystal display according to claim 20, wherein the at least one of the plurality of thin film transistors includes at least two thin film transistors coupled to one of the plurality of signal lines, and the at least two thin film transistors are alternately formed on both sides of the one of the plurality of signal lines.

28. The reflective liquid crystal display of claim 20, wherein each of a plurality of the signal lines is connected to a plurality of different colored pixels.

29. The reflective liquid crystal display of claim 1, wherein each of a plurality of the signal lines is connected to a plurality of different colored pixels.

* * * * *